United States Patent
Ichikawa et al.

(10) Patent No.: US 7,586,723 B2
(45) Date of Patent: Sep. 8, 2009

(54) POWER SOURCE FAULT DETECTION APPARATUS, PROGRAM, AND METHOD

(75) Inventors: Fumio Ichikawa, Kawasaki (JP); Naoki Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 381 days.

(21) Appl. No.: 11/420,378

(22) Filed: May 25, 2006

(65) Prior Publication Data
US 2007/0188956 A1 Aug. 16, 2007

(30) Foreign Application Priority Data
Feb. 14, 2006 (JP) ............................. 2006-036528

(51) Int. Cl.
*H02H 3/20* (2006.01)
(52) U.S. Cl. ..................................... 361/91.1
(58) Field of Classification Search ............... 361/91.1
See application file for complete search history.

(56) References Cited
U.S. PATENT DOCUMENTS
4,070,701 A * 1/1978 Harnden et al. ............... 363/25
6,507,504 B2 * 1/2003 Nishikawa ............... 363/21.15
6,707,271 B2 * 3/2004 Kitagawa ..................... 320/134

FOREIGN PATENT DOCUMENTS
JP 60-65311 4/1985

\* cited by examiner

*Primary Examiner*—Stephen W Jackson
*Assistant Examiner*—Ann T Hoang
(74) *Attorney, Agent, or Firm*—Fujitsu Patent Center

(57) ABSTRACT

A fault detection apparatus of a power source provided with a central processing unit, a power source, a power receiver supplied with current from a power source, a unit periodically accessing the power receiver from the central processing unit so as to supply a periodic current periodically repeatedly turning on and off from the power source to the power receiver, and a unit judging the power source to be defective when the output voltage of the power source exceeds a predetermined threshold value and a method and program for the same. By this, it is possible to judge a power source to be defective when fluctuations in the output voltage of a power source due to the periodic supply of current to the power receiver (voltage load fluctuations) exceed a predetermined threshold value.

10 Claims, 27 Drawing Sheets

Fig.1
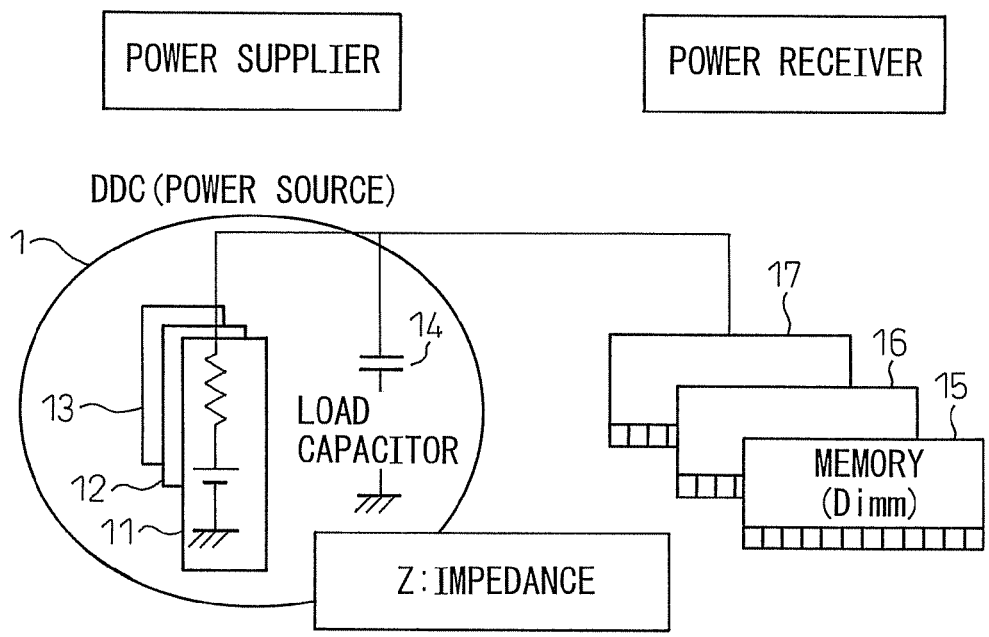
Fig.2
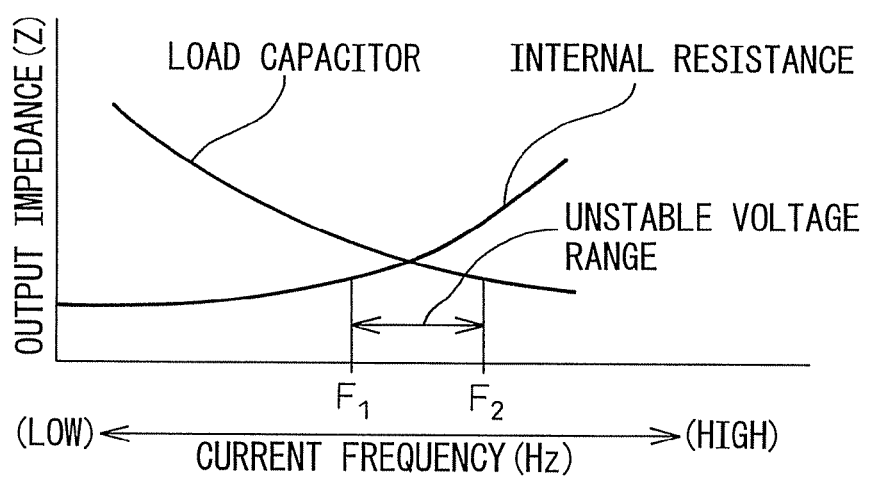
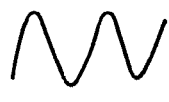

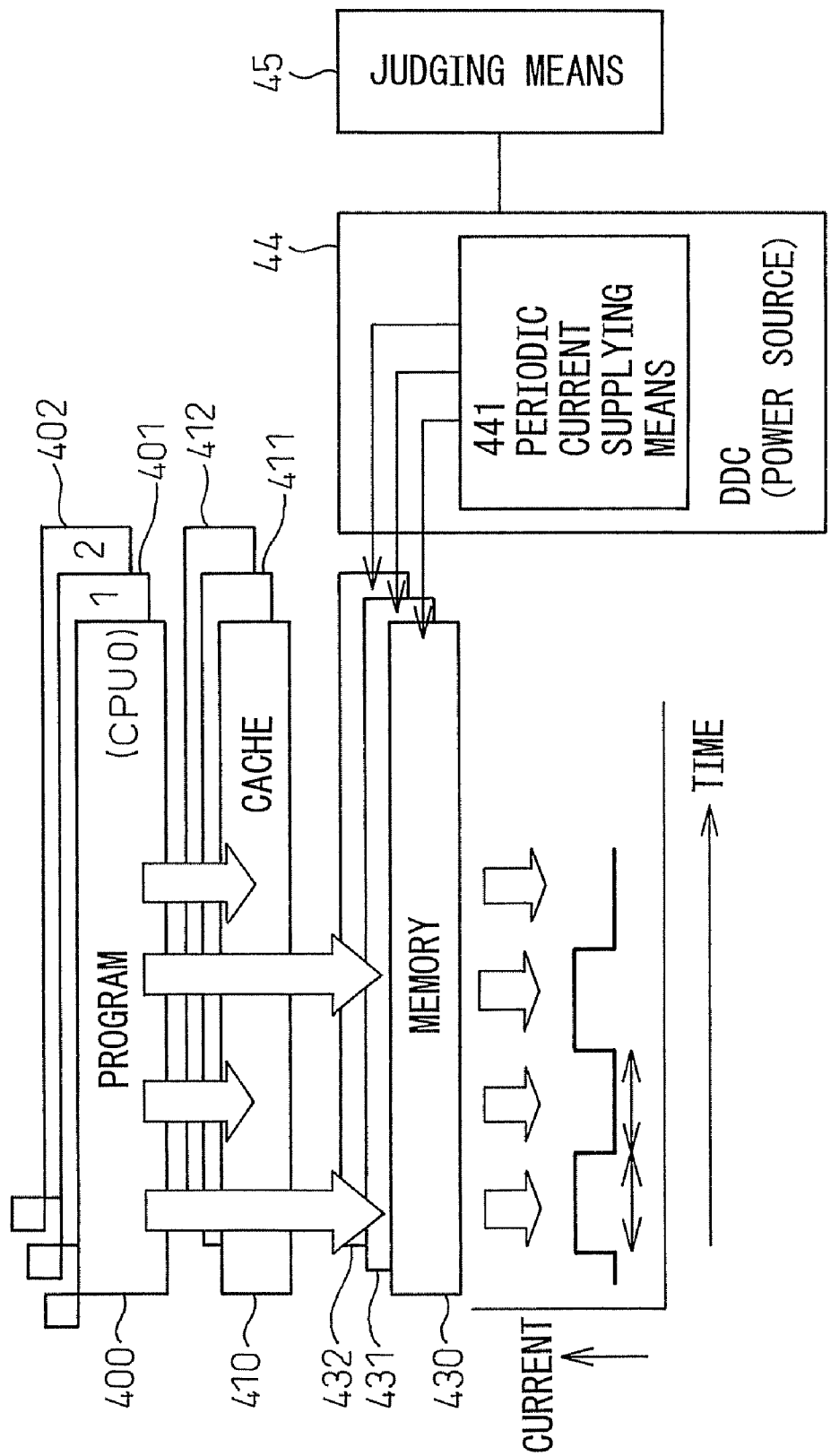

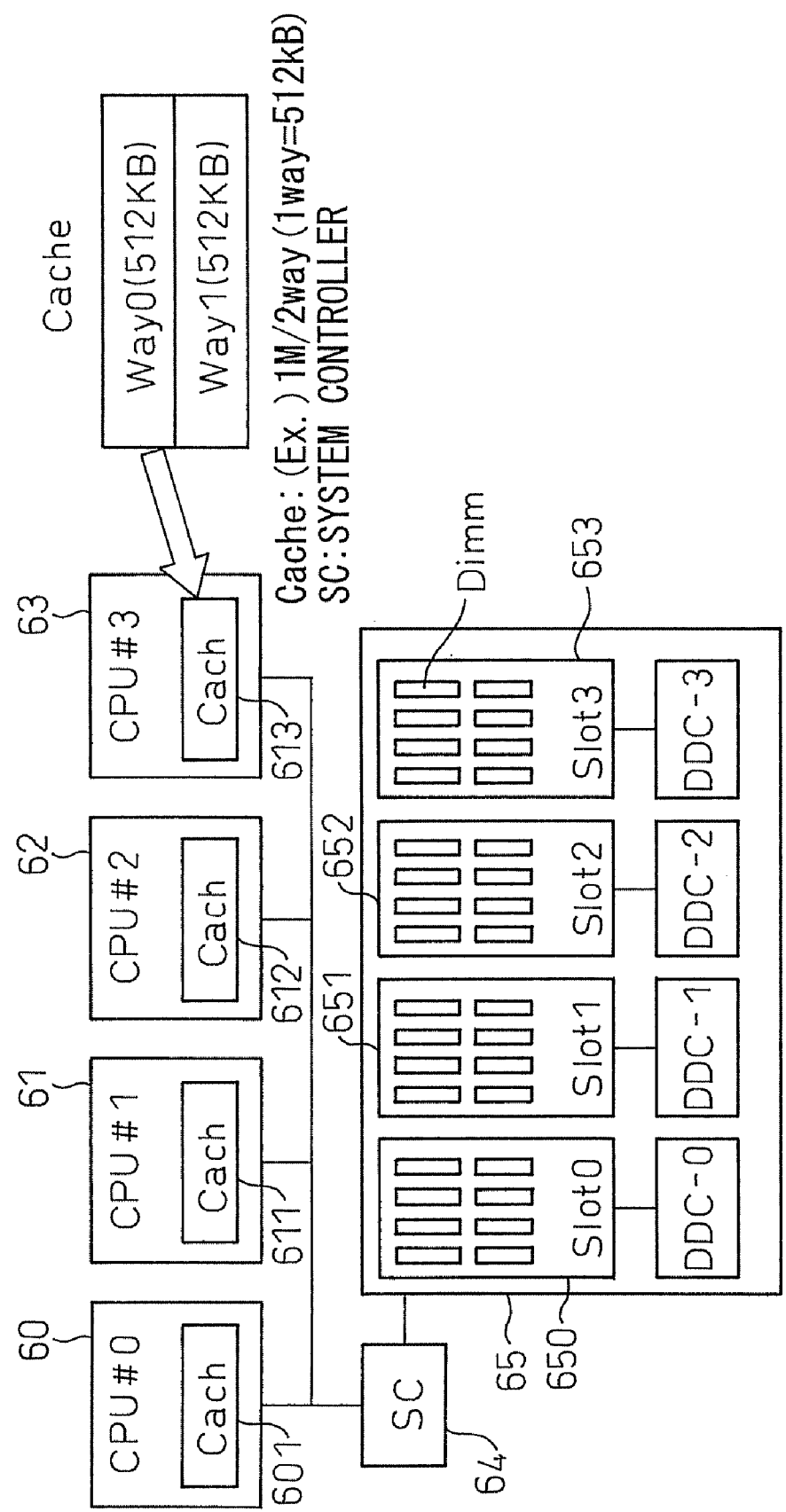

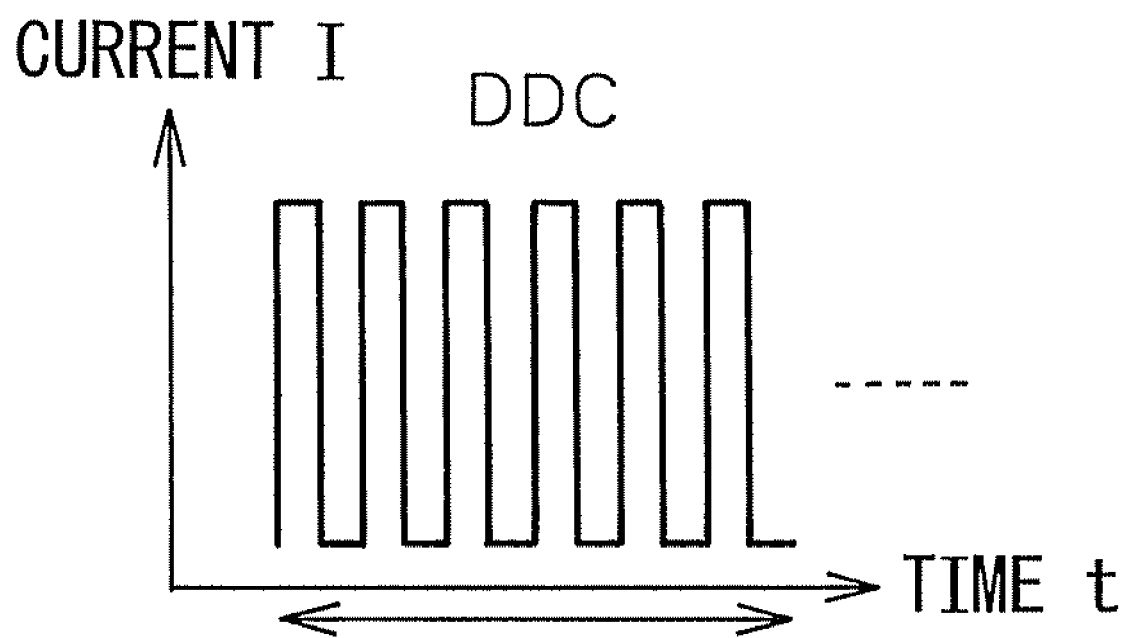

POWER SOURCE FAULT DETECTION APPARATUS, PROGRAM, AND METHOD

CROSS-REFERENCE TO RELATED APPLICATIONS

This application is based upon and claims a priority of Japanese Patent Application No. 2006-36528, filed on Feb. 14, 2006, the contents being incorporated herein by reference.

BACKGROUND OF THE INVENTION

1. Field of the Invention

The present invention relates to a power source fault detection apparatus, program, and method, more particularly relates to a fault detection apparatus, program, and method for detecting circuit trouble of a power supplier (DC/DC converter, hereinafter referred to as a "DDC") due to voltage load fluctuations of a power source of a computer system.

2. Description of the Related Art

When mounting hardware in a conventional computer system, the DDC has been mounted a considerable distance from the memory, so to suppress fluctuations in the output voltage due to fluctuations in the load of the DDC due to the supply of current from the DDC to the memory, a capacitor has been arranged in the path between the DDC and memory. Therefore, even if supplying current from the DDC to the memory, the output voltage of the DDC would not fluctuate. For details, see Japanese Patent Publication (A) No. 60-65311.

However, in recent years, computer system hardware has been mounted at a higher density. As a result, the DDC has come to be mounted at a close distance from the memory and there is no longer space for mounting a capacitor between the memory and DDC. For this reason, if supplying current from the DDC to the memory, the output voltage has ended up fluctuating due to fluctuations in the load of the DDC. When fluctuations in the load of the DDC cause fluctuations in output voltage exceeding a predetermined threshold value, the DDC is judged to be defective and cannot be shipped out.

SUMMARY OF THE INVENTION

An object of the present invention, in consideration of the above problem in the related art, is to provide a fault detection apparatus of a power source judging a power source to be defective when the fluctuations in the output voltage of the power source due to the periodic supply of current to a power receiver (voltage load fluctuations) exceed a predetermined threshold value, a program for detecting trouble in a power source, and a method of detecting trouble of a power source.

To achieve the above object, according to a first aspect of the present invention, there are provided a fault detection apparatus of a power source provided with a central processing unit, a power source, a power receiver supplied with current from the power source, a unit periodically accessing the power receiver from the central processing unit so as to supply a periodic current periodically repeatedly turning on and off from the power source to the power receiver, and a unit judging the power source to be defective when the output voltage of the power source exceeds a predetermined threshold value and a method and program for the same.

According to a second aspect of the present invention, there is provided the first aspect of the invention in which the period of the periodic current is changed to cover the entire state of output impedance of the power source.

According to a third aspect of the present invention, there is provided the first aspect of the invention wherein the power source includes a plurality of power source units, the power receiver includes a plurality of power receiving units specified by a plurality of addresses, and an address of the power receiver is specified and the power receiving unit corresponding to the specified address is supplied with a current of an on period of the periodic current to detect trouble of any power source unit corresponding to each power receiving unit.

According to a fourth aspect of the present invention, there is provided the first aspect of the invention wherein the power source includes a single power source unit, the power receiver includes a plurality of power receiving units specified by a plurality of addresses, and addresses of the power receiver are successively specified and the power receiving units corresponding to the specified addresses are supplied with a current of an on period of the periodic current to detect trouble of the power source.

According to a fifth aspect of the present invention, there is provided the first aspect of the invention wherein the power source includes a single power source unit, the power receiver includes a plurality of power receiving units specified by a plurality of addresses, and addresses of the power receiver are simultaneously specified and the power receiving units corresponding to the specified addresses are supplied with a current of an on period of the periodic current to detect trouble of the power source.

According to a sixth aspect of the present invention, there is provided the first aspect of the invention wherein the power source includes a plurality of adjoining power sources, the power receiver includes a plurality of memories, and the power receiver synchronizes currents of the on periods of the periodic currents output from the plurality of power sources and simultaneously supplies them to the plurality of memories to detect trouble of the power sources.

According to a seventh aspect of the present invention, there is provided the first aspect of the invention wherein the power receiver is a memory in a computer system, the memory is periodically accessed from a central processing unit provided with a cache memory, a current of an on period of the periodic current is supplied from the power source to the memory, and the cache memory is accessed and information is read and written in an off period of the periodic current.

According to the first aspect of the present invention, by deliberately changing the load of the power source to change the output voltage of the power source and detecting when that output voltage exceeds a predetermined threshold value, it is possible to judge that power source to be defective, so a defective power source can be detected early and a good quality of the power source can be ensured even in a high density mounting computer system.

According to the second aspect of the present invention, it becomes possible to run a power source test for the entire state of output impedance of the power source, so no matter when a spike in load capacity occurs, that state can be grasped and trouble in the power source arising due to that state can be detected.

According to the third aspect of the present invention, it is possible to detect trouble of a power source unit corresponding to a power receiving unit specified in the plurality of power receiving units.

According to the fourth aspect of the present invention, by successively supplying periodic current to a plurality of power receiving units, load fluctuation is added to the output voltage of the power source, so trouble of the power source can be detected more reliably.

According to the sixth aspect of the present invention, the plurality of adjoining power sources resonate with each other and the output voltages change in the same directions, so further voltage load fluctuations can be obtained in the outputs of the power sources and trouble in the power sources can be detected more reliably.

According to the seventh aspect of the present invention, by supplying periodic current to the memory from the power source, it is possible to detect trouble of the power source in the computer system.

BRIEF DESCRIPTION OF THE DRAWINGS

These and other objects and features of the present invention will become clearer from the following description of the preferred embodiments given with reference to the attached drawings, wherein:

FIG. 1 is a circuit diagram showing a DDC in a computer system as an example of a power supplier used in the present invention and memories in a computer system as examples of power receivers connected to the same;

FIG. 2 is a graph showing the relationship between the current frequency and output impedance of a power supplying unit;

FIG. 3A is a graph showing the waveform of the output voltage of a DDC in the case where the load capacitor is operating normally, while

FIG. 4 is a block diagram showing an outline of a fault detection apparatus of a power source according to Example 1 of the present invention;

FIG. 6 is a schematic view of the configuration of a computer system showing a specific example of Example 1;

FIG. 7B is a waveform chart showing a supply current in Example 1;

DESCRIPTION OF THE PREFERRED EMBODIMENTS

Figure 3A:
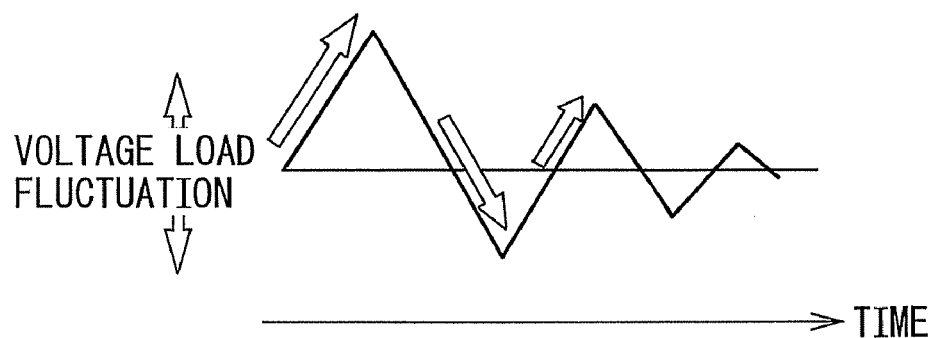

Below, embodiments of the present invention will be explained with reference to the drawings. FIG. 1 is a circuit diagram showing a DC/DC converter (hereinafter referred to as a "DDC") in a computer system as an example of the power supplier used in the present invention and memories in the computer system as examples of power receivers connected to the same (Dimm: dual inline memory modules). In the figure, the DDC 1 includes a plurality of power supplying units 11, 12, 13 .... The outputs of the power supplying units are connected to a load capacitor 14 for stabilizing the outputs. The power supplying units 11, 12, 13, ... are respectively connected to memories 15, 16, 17, ...

The load capacitor 14 has the function of easing voltage fluctuations at the power receivers and keeping the output voltages within a certain range. That is, if the resistance value in the memory 15 is R, when current is supplied from the power supplying unit 11 to the memory 15, due to Ohm's law (V=IR), the supply voltage ends up increasing. To suppress this increase, the output of the power supplying unit 11 is connected to the load capacitor 14. The output impedance formed by this load capacitor 14 and the internal resistance R of the power supplying unit 11 is adjusted to hold the output voltage constant.

The load capacitor C, internal resistance R, and output impedance Z have the following relationship as is well known:

$$1/Z = (1/R) + J\omega C$$

$$Z = \sqrt{(1/(1+\omega CR^2)) + J(-\omega CR^2/(1+\omega CR^2))}$$

FIG. 2 is a graph showing the relationship between the current frequency and output impedance of the power supplying unit 11. The lower the output impedance, the stabler the output voltage is held. As illustrated, from the part where the current frequency is low to the point where the impedance of the load capacitor and the impedance of the internal resistance intersect, the internal resistance R keeps the output voltage substantially constant, while from the point where the impedance of the load capacitor and the impedance of the internal resistance intersect to the part where the current frequency is high, the load capacitor C keeps the output voltage substantially constant. There is an unstable range of voltage between the frequency $F_1$ and $F_2$ around the point where the impedance of the load capacitor and the impedance of the internal resistance intersect. In this unstable range of voltage, in particular, the tracking of voltage load fluctuations by the capacitor becomes unstable and the voltage is no longer held constant.

Figure 3B:
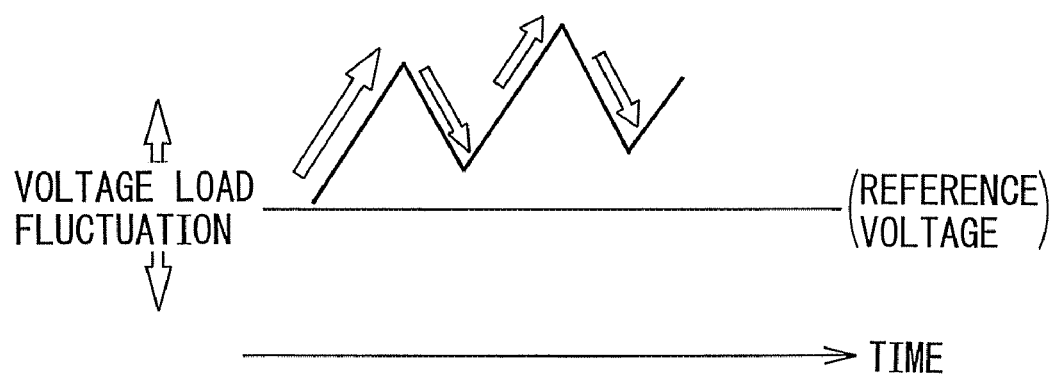
FIG. 3B is a graph showing the waveform of the output voltage of a DDC in the abnormal case where the load capacitor does not track load fluctuations.

FIG. 3A shows the waveform of the output voltage of a DDC in the case where the load capacitor is normally operating, while FIG. 3B is a graph showing the output voltage of a DDC in an abnormal case where the load capacitor is not tracking load fluctuation. As shown in FIG. 3A, in the normal case, the load capacitor 14 repeatedly suitably charges and discharges and therefore the output voltage of the DDC will not greatly exceed the reference voltage. However, as shown in FIG. 3B, in the abnormal case, charging is repeated before the load capacitor is fully discharged. As a result, the output voltage of the DDC gradually ends up exceeding the reference voltage. This abnormal charging and discharging is believed to be caused by insufficient capacity or defects of the capacitor or an excessively large load. Therefore, according to the present invention, the state near this intersection is comprehensively made to be manifested to create the maximum extent of the amount of voltage load fluctuation so as to detect a defective DDC early and ensure quality.

EXAMPLE 1

FIG. 4 is a block diagram showing an outline of a fault detection apparatus of a power source according to Example 1 of the present invention. In the figure, this fault detection apparatus as one example is provided with three central processing units CPU0, CPU1, CPU2, power receivers comprised of the three memories 430, 431, and 432, a power source comprised of the DDC 44, and a judging means 45. The three CPU0, CPU1, and CPU2 are respectively provided with tasks comprised of the programs 400, 401, and 402 and cache memories 410, 411, and 412.

For example, by having the program 400 make the CPU0 periodically access the memory 430, a periodic current periodically repeatedly turning on and off is supplied from the periodic current supply means in the DDC 44 to the memory 430. In the on period of the periodic current, the memory 430 is supplied with a current, while in the off period, the cache memory 410 is accessed. When the memory 430 is supplied with current, the load fluctuation voltage is repeatedly charged and discharged. While the cache memory 410 is being accessed, the DDC 44 does not supply current. The judging means 45 judges that the DDC 44 is abnormal when the load fluctuation voltage exceeds a predetermined threshold value.

Figure 5:
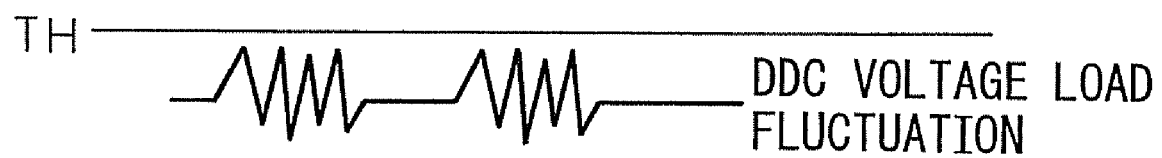
FIG. 5 is a waveform chart showing the output of the DDC, that is, the load fluctuation voltage.

FIG. 5 is a waveform chart showing the output of the DDC 44, that is, the load fluctuation voltage. As shown in FIG. 5, if the load fluctuation voltage is within the range of a predetermined threshold value TH, the DDC is judged not to be abnormal.

FIG. 6 is a schematic view of the configuration of a fault detection apparatus of a power source showing a specific example of Example 1. In the figure, 60 to 63 are CPUs respectively provided with cache memories 601, 602, 602, 603, and 604, 64 is a system controller, and 65 is a memory. The memory 65 includes slots 650 to 653. The slots are respectively supplied with periodic currents from the power sources DDC0, DDC1, DDC2, and DDC3. The cache memory has a capacity of for example 1 Mbyte. It has a two-way configuration of an upper way and a lower way, with each way being 512 kB. 1 slot, in the illustrated example, is comprised of eight Dimms. Each Dimm has for example a capacity of 1 GB. The eight slots in total therefore have a capacity of 32 GB. The example of FIG. 6 is provided with 32 memories called Dimms (if 1 Dimm=1 GB device, the memory capacity is 32 GB).

If accessing this memory, the read data is sent to a CPU through the system controller and bus, but to speed up the data processing, usually a CPU has an internal cache of several Mbytes. This cache stores data and transfers data with a register in the CPU. Regarding the relationship between this memory and cache, when the cache does not include data, it is accessed from the memory, while when the cache includes data, the data is accessed from the cache. Note that when the cache is full and data is newly accessed from the memory, old data is written back into the memory and that location of the cache is overwritten with the new data. When data to be added from the CPU cache and data in the memory match, the data is not returned to the memory, but is discarded.

In the present invention, the case of access from the memory (current on state) and the case of access from the CPU cache (current off state) are separated by a program to give the current periodicity. Further, by adjusting the memory addresses accessed, the DDCs covered are separated.

Figure 7A:
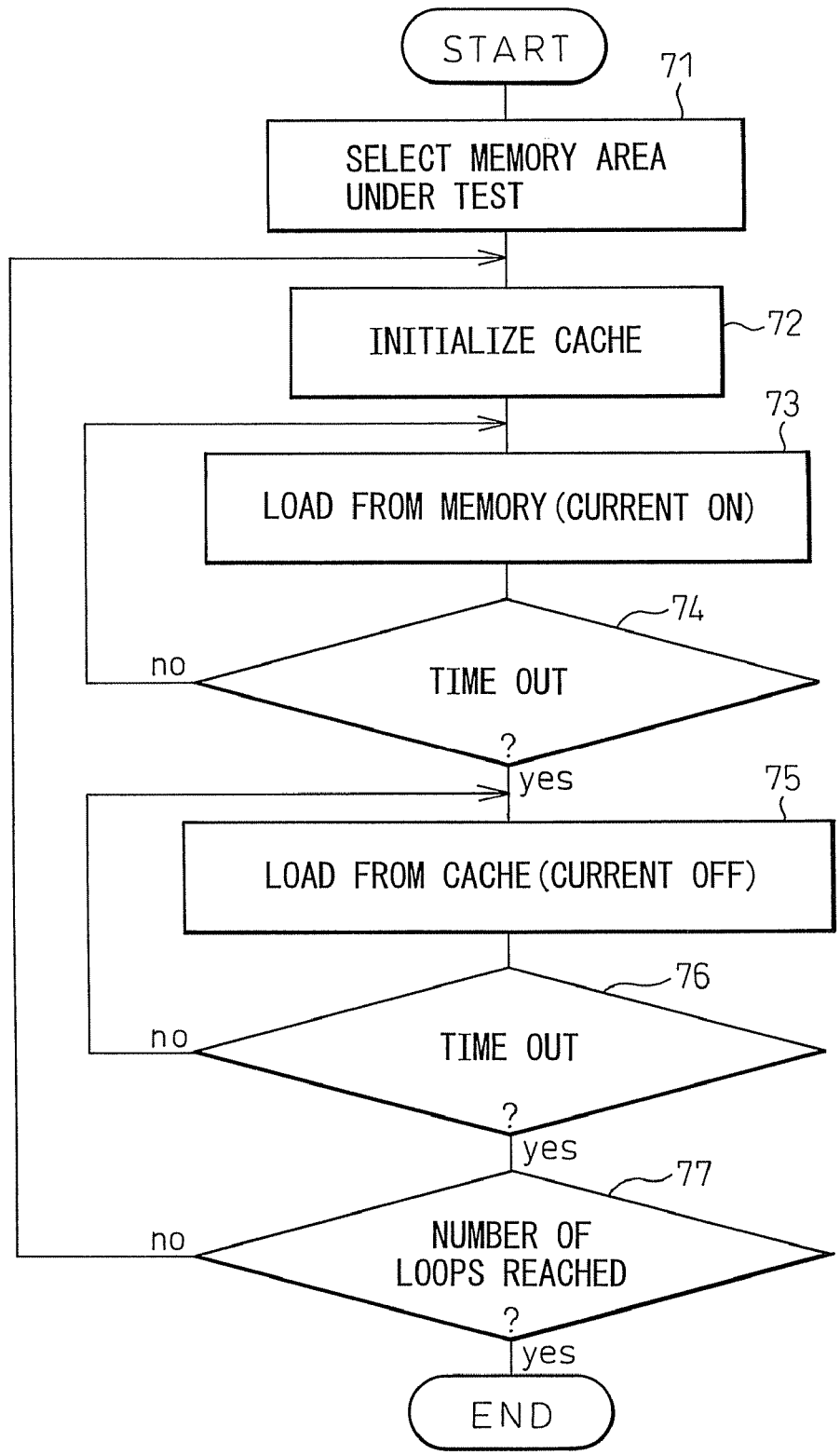
FIG. 7A is a flow chart explaining the operation of a test system according to Example 1 of the present invention.

FIG. 7A is a flow chart for explaining the operation of the computer system shown in FIG. 6. In the figure, at step 71, the memory area under test is selected. At step 72, the cache memory corresponding to the memory under test is initialized. At step 73, data is loaded from the memory. That is, the current of the on period of the periodic current shown in FIG. 7B is supplied to the memory. Next, at step 74, it is judged if a predetermined time has run out. If not, the routine returns to step 72. If the judgment at step 74 is that the time has run out, the routine proceeds to step 75, where data is loaded from the cache memory. That is, the periodic current is turned off. Next, at step 76, it is judged if a predetermined time has run out. If not, the routine returns to step 72. If the judgment at step 76 is that the time has run out, it is judged at step 77 if a predetermined number of loops has been achieved. If not, the routine returns to step 72. If yes, the processing is ended. In Example 1, the on period of the periodic current is constant. For example, to create a current frequency of 50 kHz, it is possible to repeat memory access and CPU cache access every 40 μs. Similarly, in the case of 100 kHz, it becomes each 20 μs.

EXAMPLE 2

Figure 8:
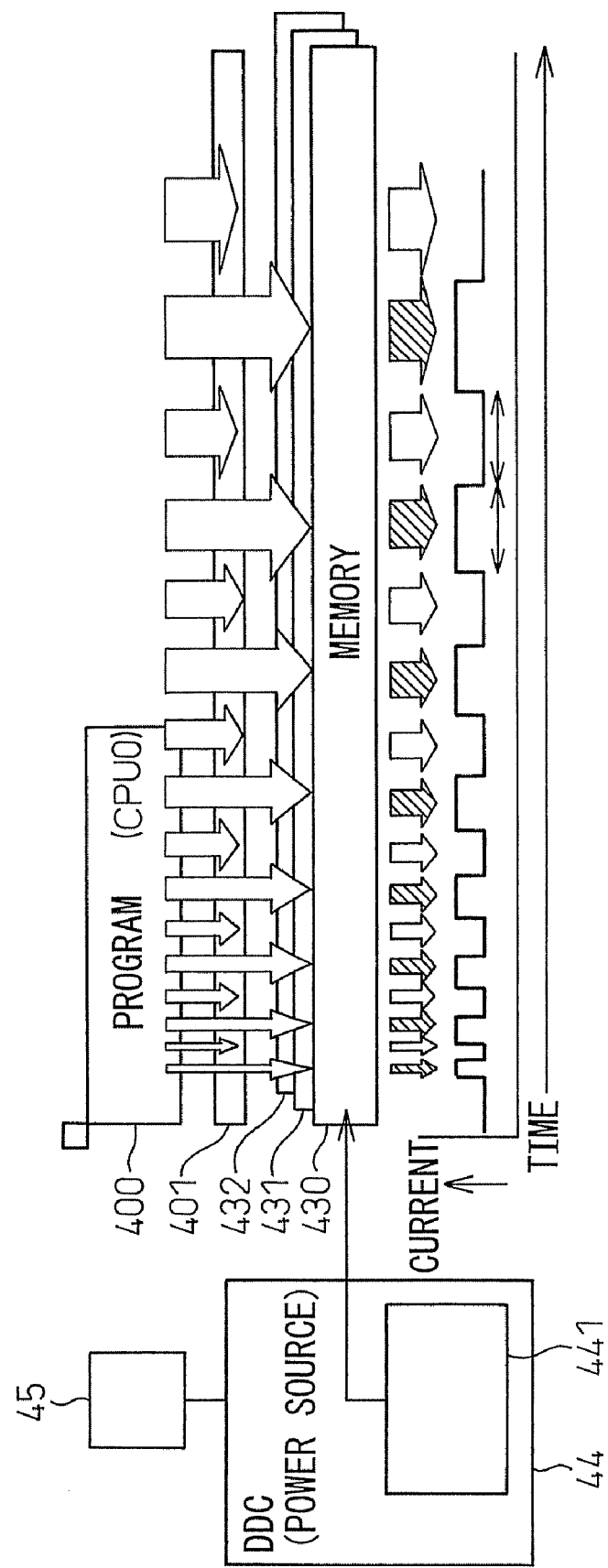
FIG. 8 is a block diagram showing an outline of a fault detection apparatus of a power source according to Example 2 of the present invention.

FIG. 8 is a block diagram showing an outline of a fault detection apparatus of a power source according to Example 2 of the present invention. In the figure, the point of difference from the system of Example 1 shown in FIG. 4 is that the duration of the current period referred to in Example 1 can be freely adjusted by increasing the time during which the memory is accessed (current on state) and the time during which the CPU cache is accessed (current off state) bit by bit.

By realizing this operation, it is possible to cover all states of the graph which represents the relationship between the output impedance and the load capacitor shown in FIG. 2. That is, if the period of the current is long, the state is positioned at the left side of the graph. As the period of the current becomes shorter, the state shifts to the right in the graph.

Due to this, no matter what point of time a spike like load fluctuation occurs, that state can be grasped and trouble occurring due to that state can be detected.

Figure 9A:
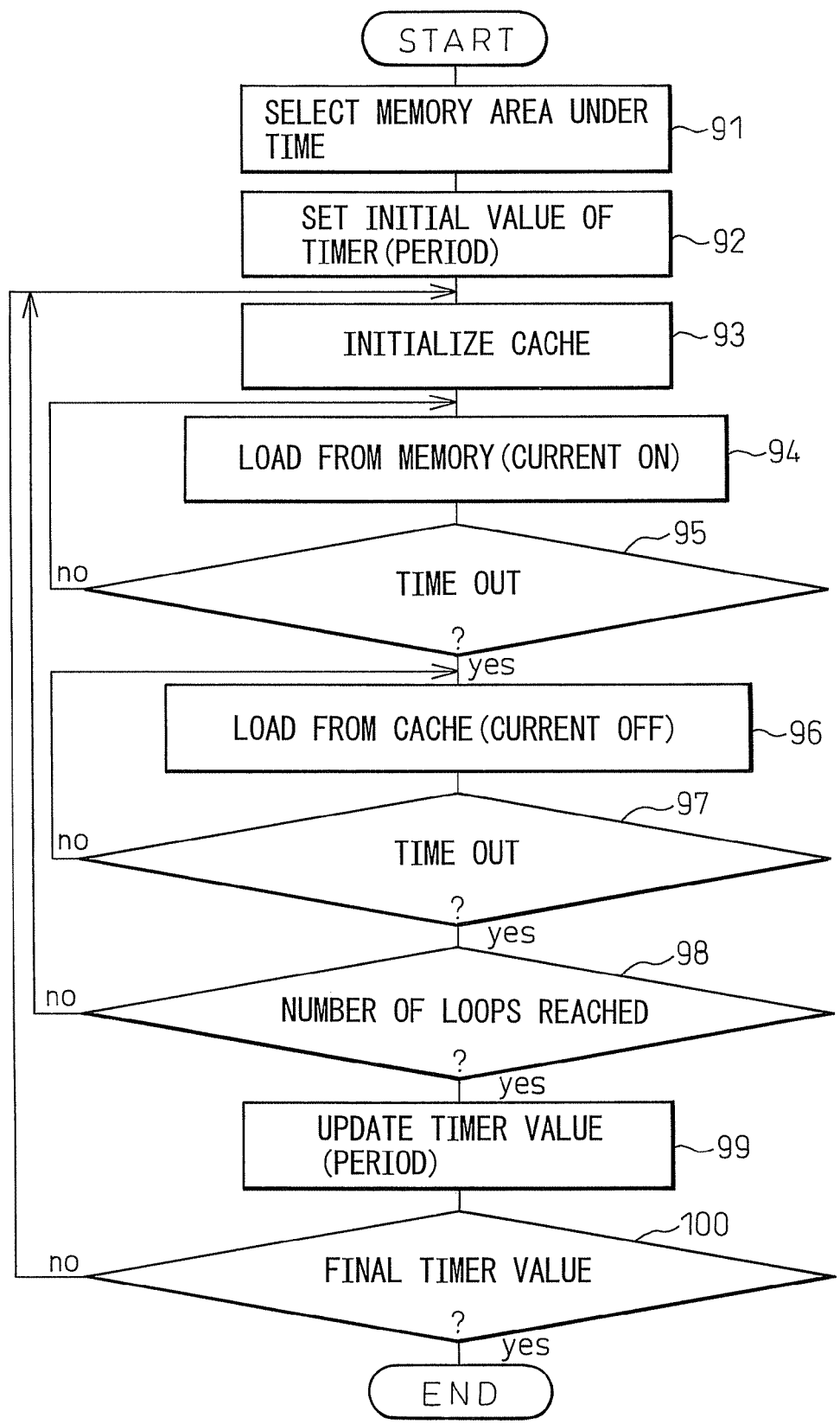
FIG. 9A is a flow chart for explaining the operation of a test system shown in FIG. 8.

FIG. 9A is a flow chart for explaining the operation of the fault detection apparatus shown in FIG. 8. In the figure, the routine from step 91 to step 98 is the same as the routine from steps 71 to 77 of FIG. 7 except for the step of initialization of the time of step 92. In FIG. 9, further, steps 98 to 100 are added.

Figure 9B:
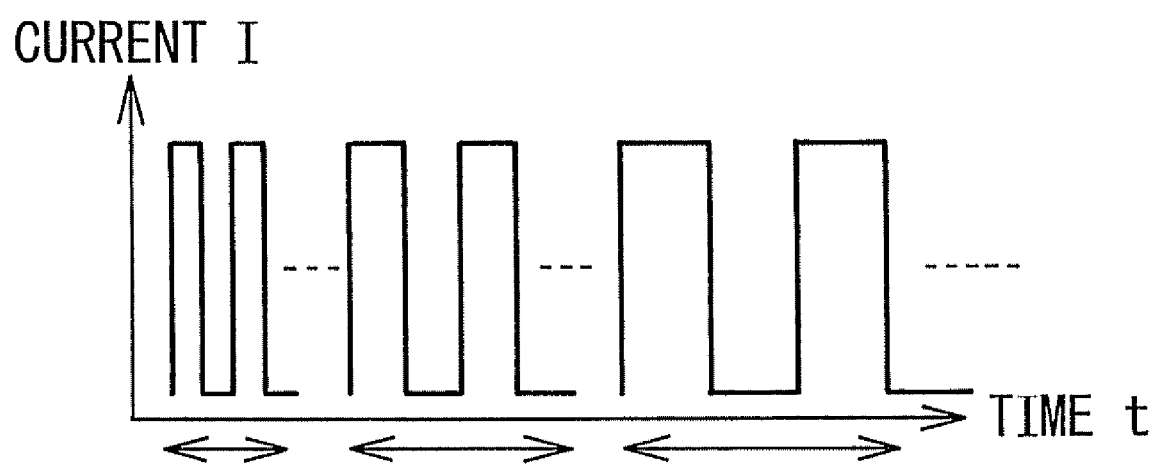
FIG. 9B is a waveform chart showing the supply current in Example 2.

In Example 2, not only is the current supplied from the DDC 45 given periodicity (waveform), but also, as shown in FIG. 9B, the factor of time is introduced into the periodicity. By increasing the time during which data is accessed from the memory (current on) and the time during which data is accessed from the CPU cache (current off) bit by bit, the current period changes linked with the access time.

For example, when changing the current frequency from 500 kz to 50 kz by 1 kz decrements and repeating this 1000 times in one period, it is sufficient to set the timer of the initial value to 1 μs, the increase in the timer to 0.1 μs, and the number of loops to 1000 and execute the flow shown in FIG. 9.

Due to this, when the output voltage from the DDC exceeds a predetermined threshold value, the presence of any trouble in a DDC can be judged much more reliably than the case of Example 1.

Next, in Examples 1 and 2, the method of separating access from the memory and access from the cache by the same memory address will be explained.

Figure 10:
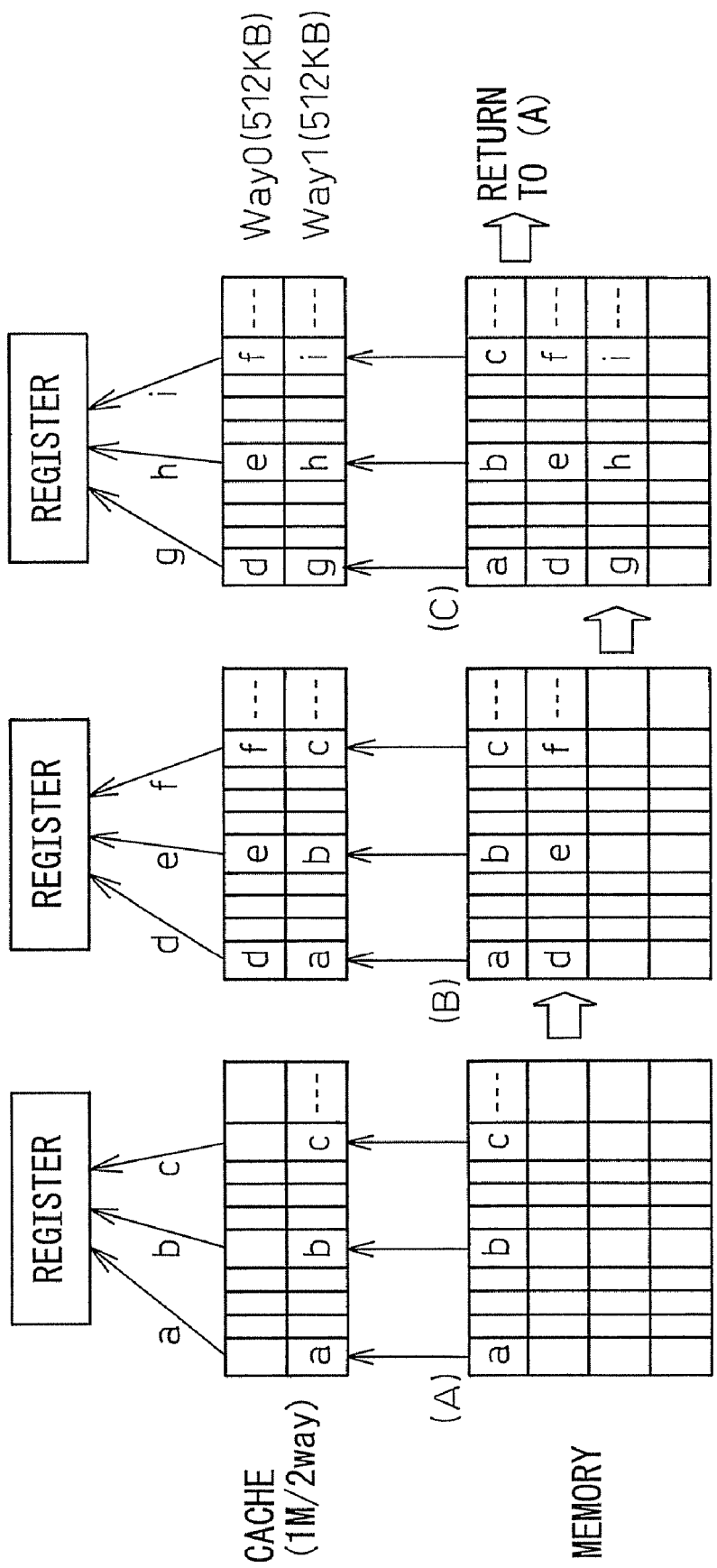
FIG. 10 is a conceptual view showing a method of separating a memory load and cache load in accesses of the same address.

FIG. 10 is a conceptual view of the method of separating a memory load and cache load by access by the same address. Below, the program operation will be explained taking as an example one slot and one cache in the system configuration shown in FIG. 6.

(A) In the state (A) where the cache is initialized, if data are loaded from the address (a) of the memory under test and the addresses (b) and (c) separated by 256 bytes, the data from the addresses (a), (b), and (c) are transferred from the memory to the cache, then loaded in the register.

(B) Next, when data is loaded from the addresses (d), (e), and (F) separated by the way size in the cache (state B), data is stored from the addresses (d), (e), and (f) into a way different from the cache way of the data stored in the addresses (a), (b), and (c) and loaded into the register.

(C) Similarly, when data is loaded from the addresses (g), (h), and (i) separated by the way size (state C), data from the addresses (g), (h), and (i) are overwritten at the positions of the addresses (a), (b), and (c) where the oldest data stored in the cache are stored, then loaded into the register.

After this, the states (A), (B), and (C) are repeated so as to load data from the memory at all times. Further, for example, when the state (A) ends, by repeatedly loading only the data from the addresses (a), (b), and (c), data is constantly loaded from the cache in the register. That is, this state means that there is no access of data from the memory and means that no current is supplied from the DDC either.

EXAMPLE 3

Figure 11:
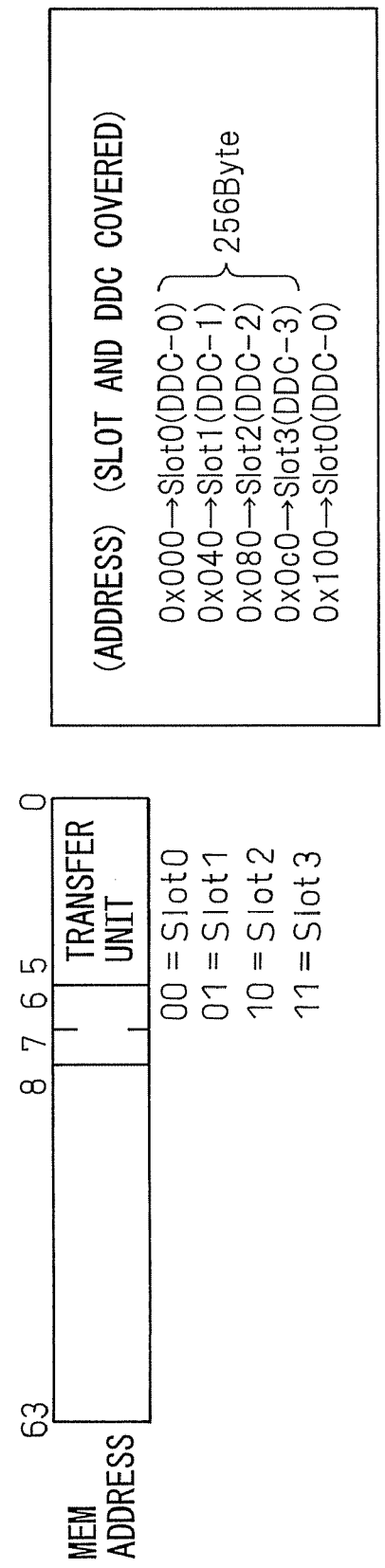
FIG. 11 is a view showing the positional relationship between memory addresses for specifying DDCs by a program and DDCs according to Example 3 of the present invention.
Figure 12:
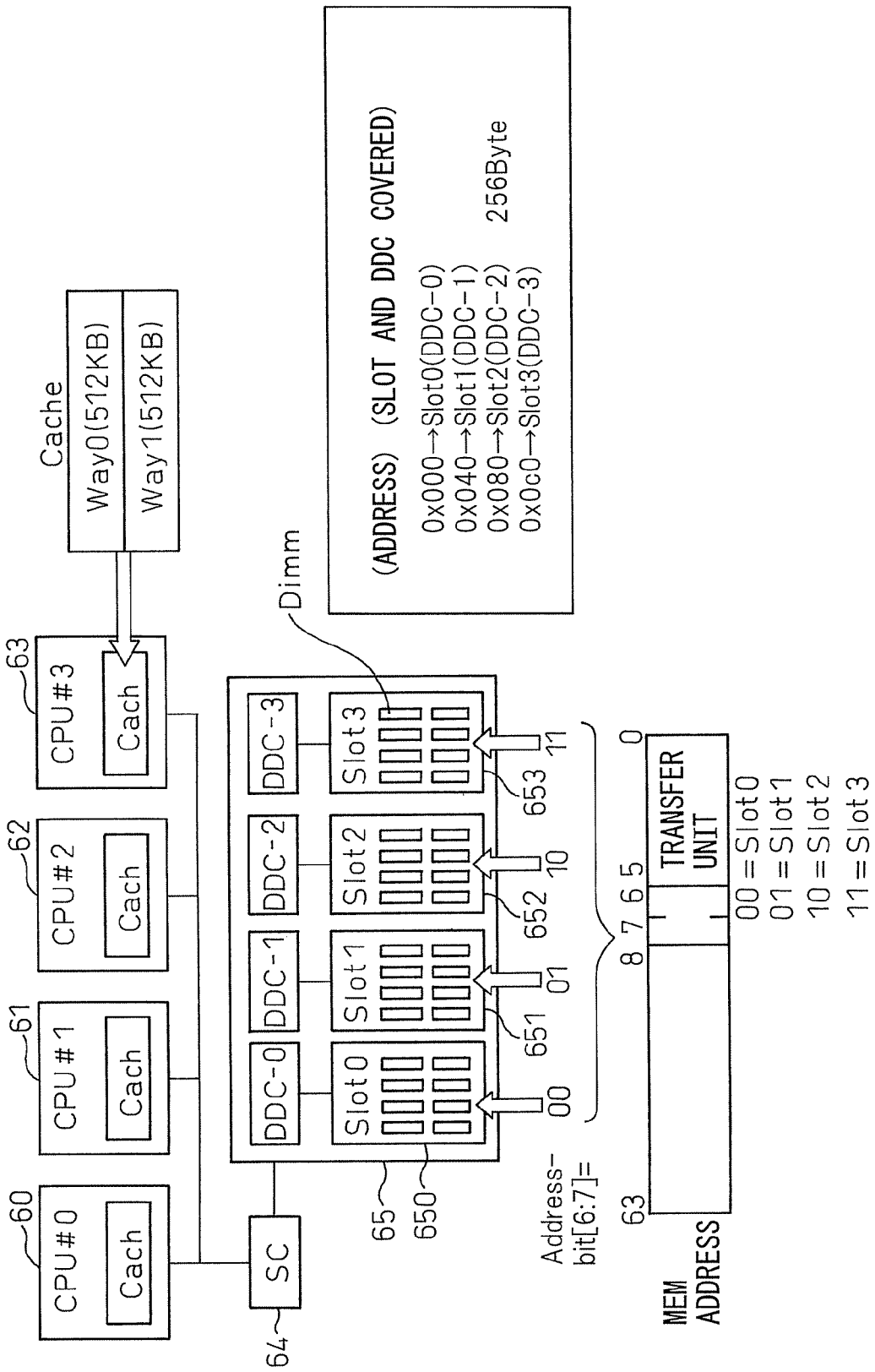
FIG. 12 is a schematic view of the configuration of a computer system showing a specific example of Example 3 of the present invention.

FIG. 11 is a view showing the positional relationship of the memory addresses for specifying DDCs by a program and the DDCs according to Example 3 of the present invention. In this figure, the 64 bytes of the bits 0 to 5 of the addresses show the units of transfer of data. The higher 2 bit show the positions of the DDCs. That is, by fixing the bits 6 and 7 of the addresses for access at all times, it becomes possible to supply power from a specific DDC. Depending on the system, sometimes the correspondence between the DDCs and memory addresses cannot be determined by the higher 2 bits in the above way, but basically the positions of the DDCs can be specified by the memory addresses. FIG. 12 is a schematic view of the configuration of a computer system showing a specific example of Example 3 of the present invention. In the figure, parts the same as the computer system shown in FIG. 6 are shown by the same reference numerals.

Figure 13:
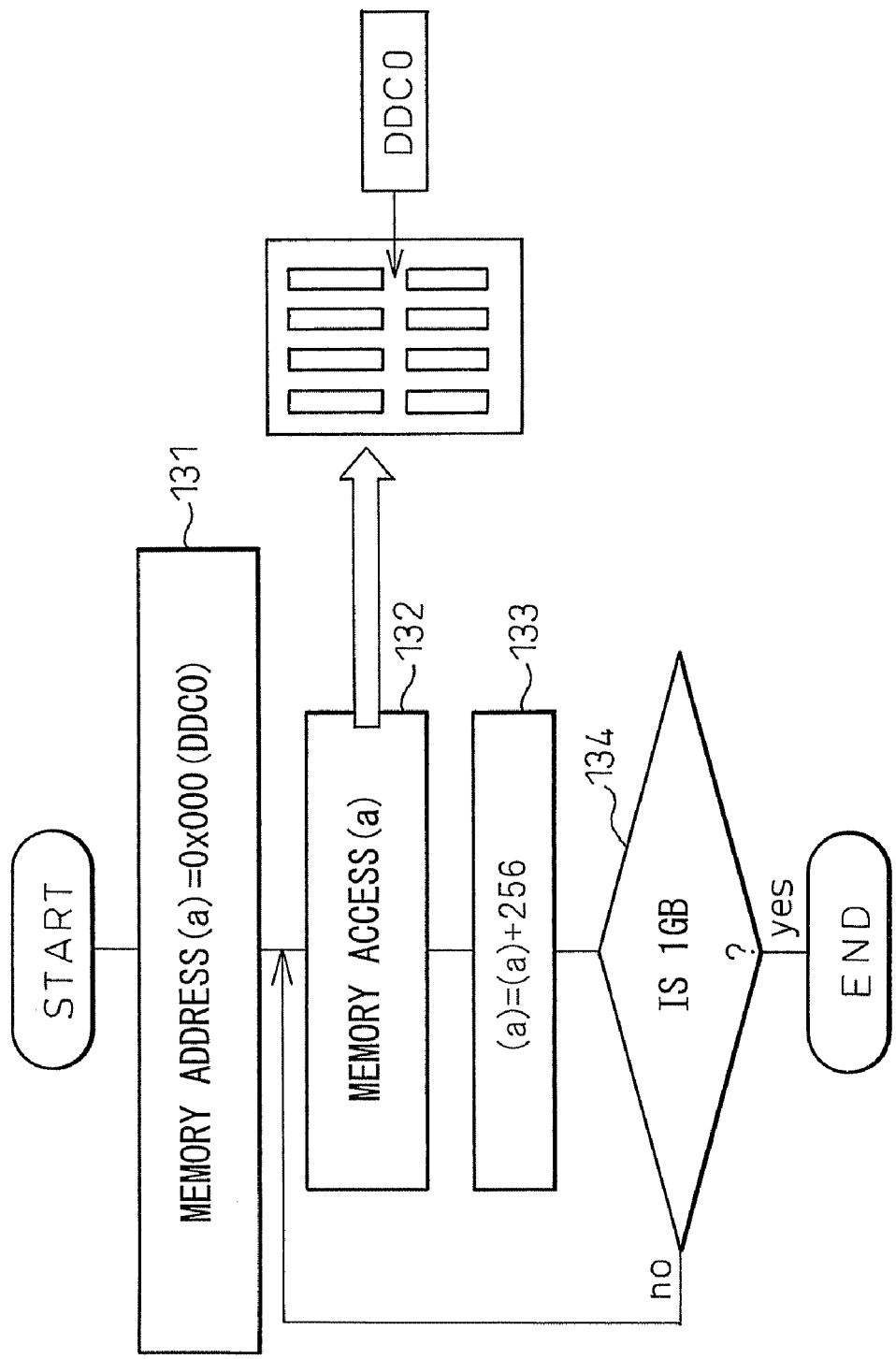
FIG. 13 is a flow chart for explaining the test operation of a DDC in a computer system shown in FIG. 12.

FIG. 13 is a flow chart for explaining the fault detection operation of a DDC in the computer system shown in FIG. 12. For example, to test the DDC0, the bits 6 and 7 of the memory addresses are fixed at 00. When testing the other DDC1, DDC2, and DDC3, the bits 6 and 7 of the memory addresses are fixed to 01, 10, and 11, respectively.

The test range is for example set as 1 Gbyte from the address 0 in the head address 0 (provisionally defined as (a)) as step 131. Next, at step 132, the address (a) in the memory is accessed and current is supplied there from the DDC0. Next, at step 133, 256 is added to the address to update the address. Steps 132 and 133 are repeated until 1 GB of a fault detection range. Due to this, it is possible to supply current to the entire memory to detect faults of the DDCs, so it is possible to avoid fault detection of DDCs at uneven locations of the memory.

EXAMPLE 4

Figure 14:
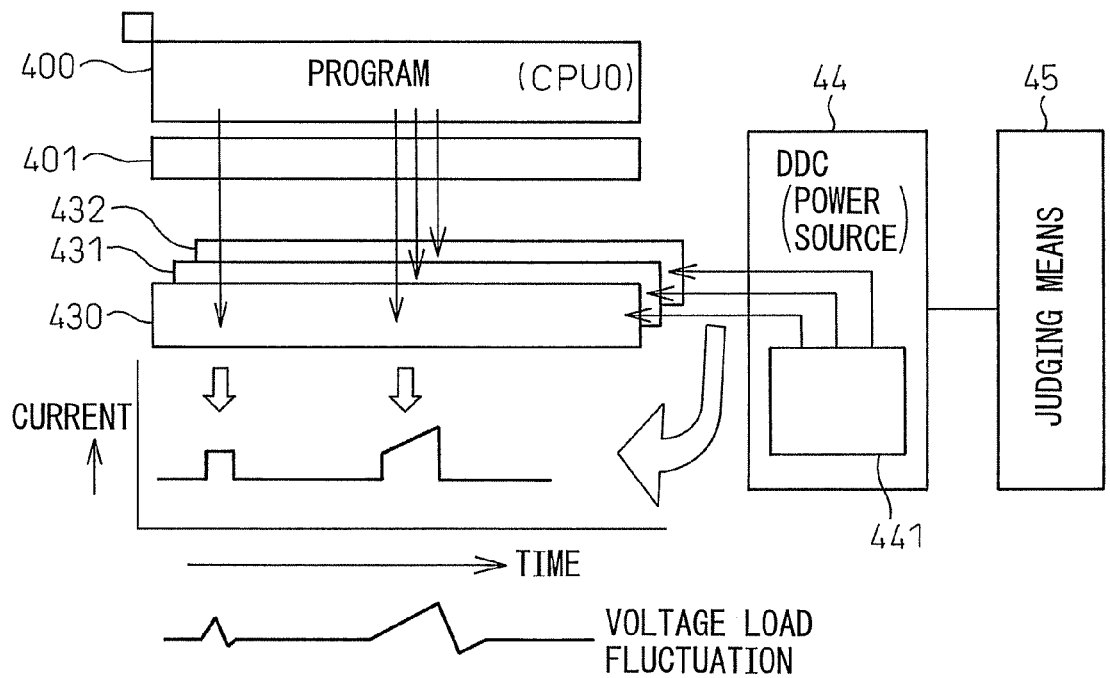
FIG. 14 is a showing an outline of a fault detection apparatus of a power source according to Example 4 of the present invention.

FIG. 14 is a block diagram showing an outline of the fault detection apparatus of a power source according to Example 4 of the present invention. In the figure, the point of difference of the fault detection apparatus of Example 1 shown in FIG. 4 is that, in Example 4, the memory areas successively accessed by the DDC 44 are enlarged and the amount of current supplied from the DDC 44 is increased so as to increase the voltage load fluctuation and enable DDC trouble to be quickly and accurately detected.

In this operation, by accessing a memory from the program 400, a slight amount of current flows from the DDC 44 to the memory. Linked with this current, a slight amount of voltage fluctuation occurs in the output voltage of the DDC 44. Similarly, if successively accessing a plurality of the memories, slight amounts of current flow to these memories, so the total voltage fluctuation is generated at the output of the DDC 44. When this total voltage fluctuation exceeds a predetermined threshold value, the fact of the DDC 44 having some trouble can be quickly and reliably judged.

Figure 15:
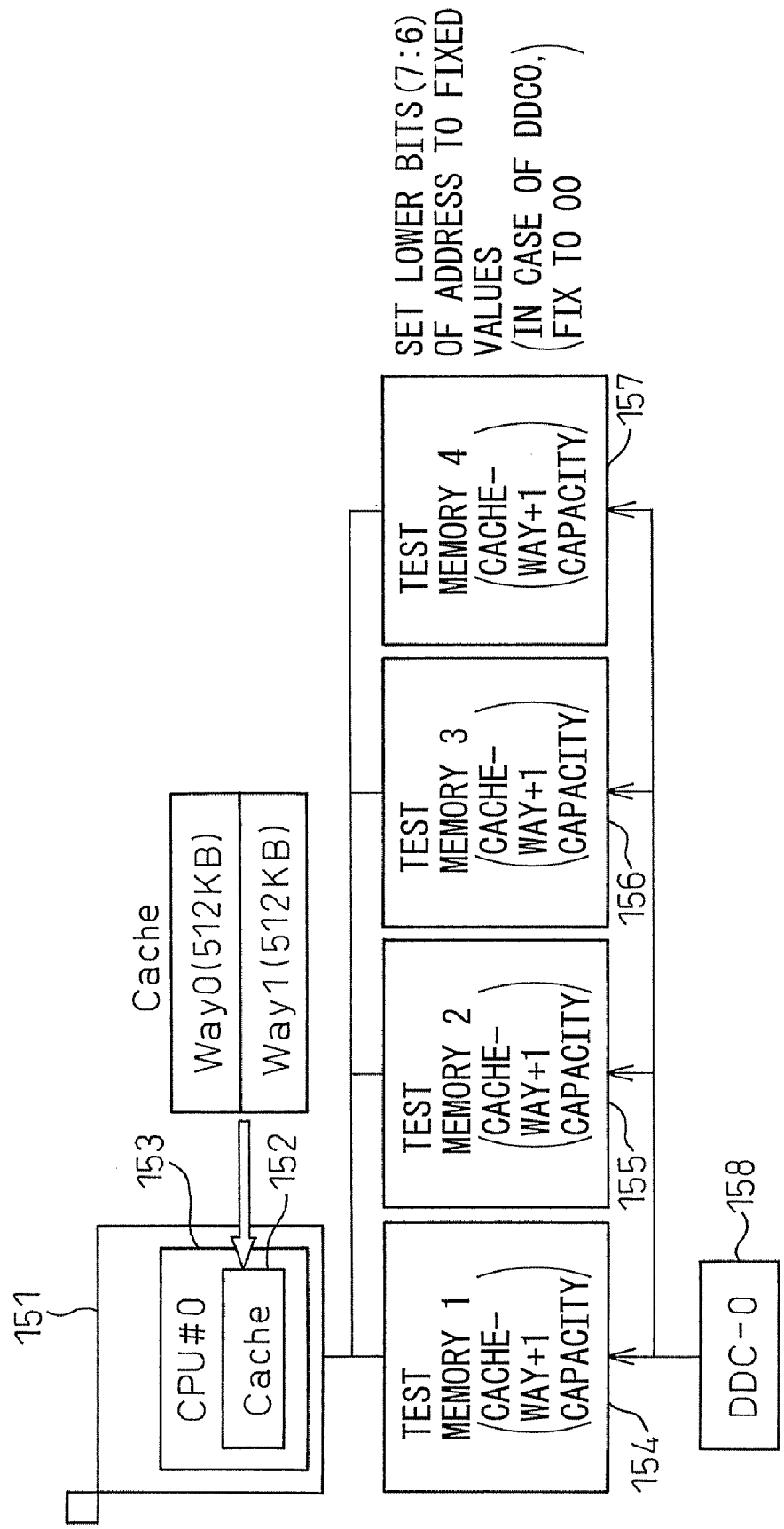
FIG. 15 is a schematic view of the configuration of a computer system showing a specific example of Example 4.

FIG. 15 is a schematic view of the configuration of a specific example of Example 4. In the figure, 151 indicates a task executed by the CPU 153 having the built-in cache memory 152, 154 to 157 indicate test memories, and 158 indicates a power source (DDC-0).

In this way, in Example 4, the task 151 assigned to a single CPU obtains a plurality of test memories 154 to 157 and concentrates the load in the same DDC by the memories so as to accelerate the voltage load fluctuations in the output of the DDC-0, so trouble in the DDC can be more quickly and reliably detected.

Figure 16:
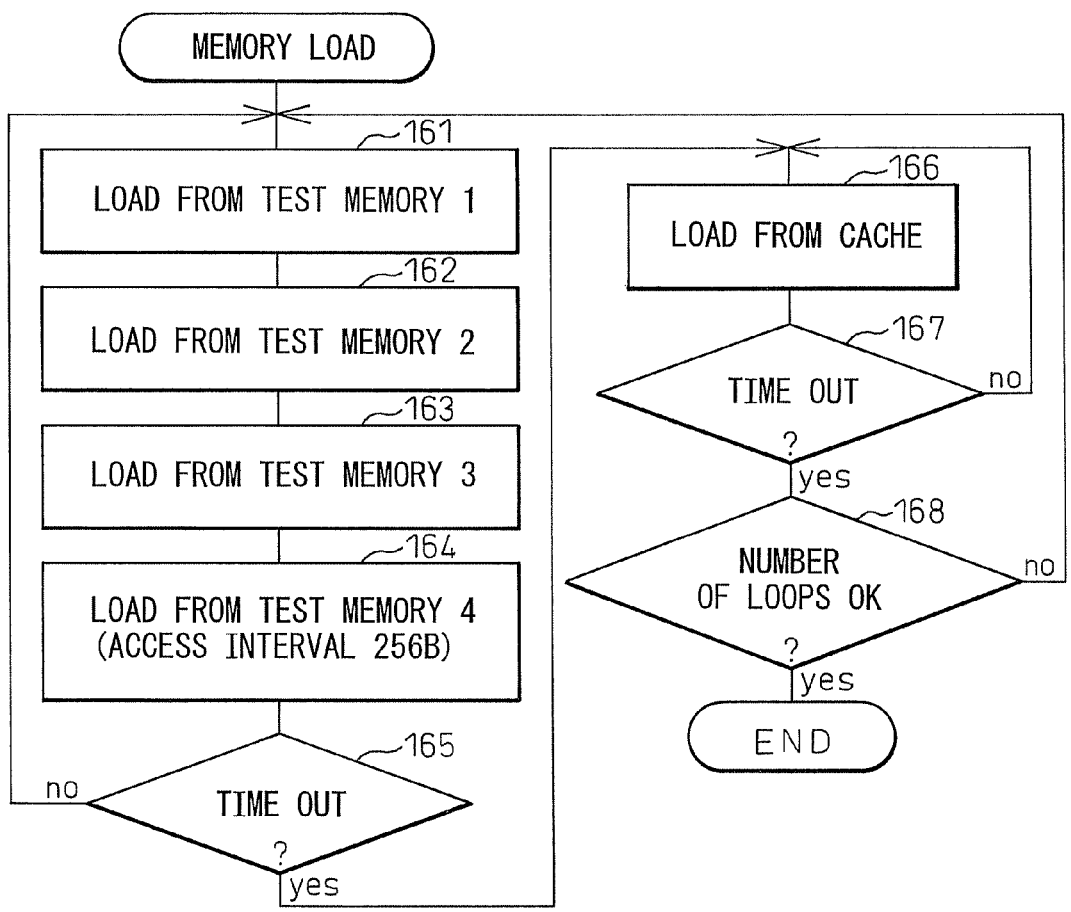
FIG. 16 is a flow chart for explaining a power source fault detection operation in a computer system shown in FIG. 15.

FIG. 16 is a flow chart for explaining a power source fault detection operation in the computer system shown in FIG. 15. In the figure, from steps 161 to 164, the test memory 1 (154) to test memory 4 (157) are successively accessed and the memory contents loaded. The access interval of the test memories, in the same way as the case shown in FIG. 11, is for example 256 bytes. This successive access of the test memories is repeated for a predetermined time. When it is judged at step 165 that the predetermined time has elapsed, at step 166, data is loaded from the cache memory 152 for a separate predetermined time. Further, the operation from step 161 to step 167 is performed for exactly the predetermined number of loops. At step 168, if the predetermined number of loops is exceeded, the processing is ended.

EXAMPLE 5

Figure 17:
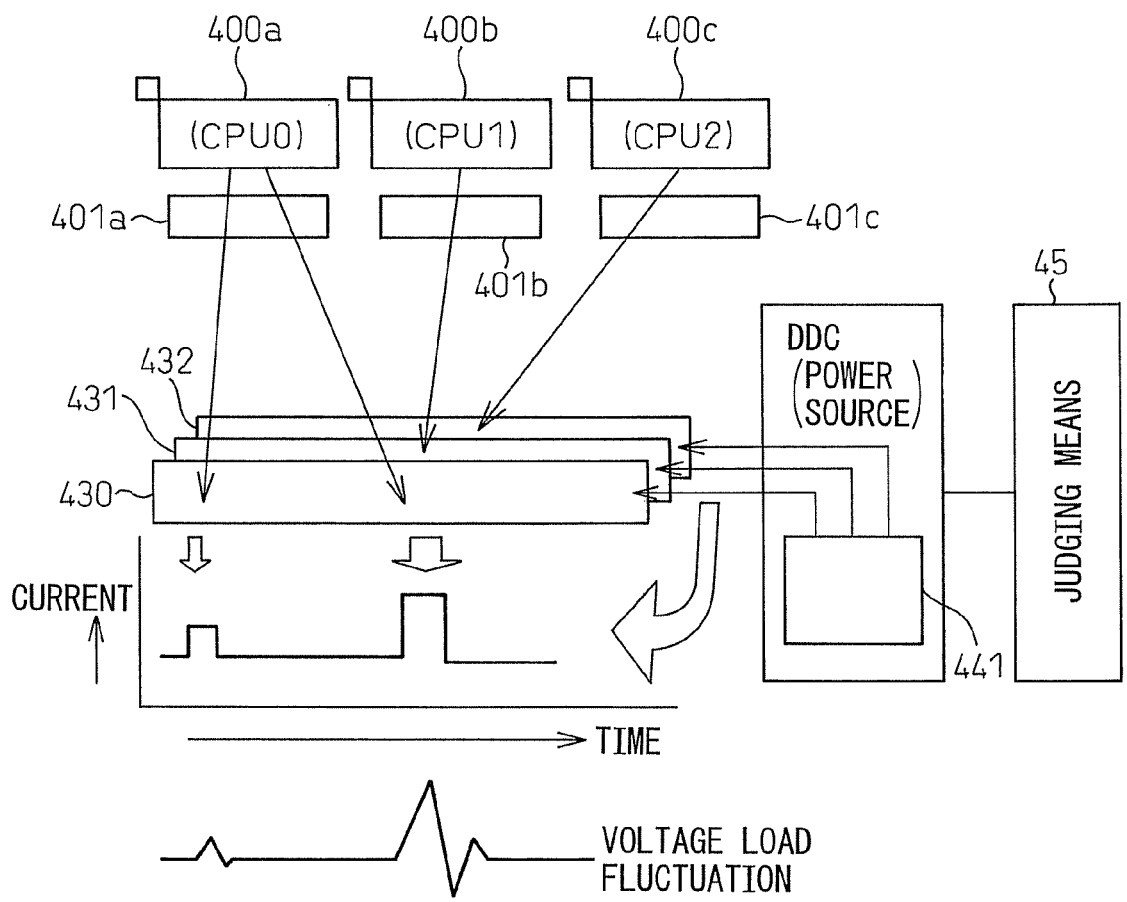
FIG. 17 is a block diagram showing the schematic configuration of a computer system according to Example 5 of the present invention.

FIG. 17 is a block diagram showing the schematic configuration of a computer system according to Example 5 of the present invention. In the figure, the point of difference from the fault detection apparatus of Example 1 shown in FIG. 4 is that, in Example 1, a single CPU accessed the memories, while, in Example 5, a plurality of CPUs 400*a*, 400*b*, and 400*c* simultaneously access a plurality of memories 430, 431, and 432. Due to this, as shown at the bottom of the figure, it is possible to cause rapid voltage load fluctuations in the output of a DDC and thereby detect trouble of a DDC much more quickly and reliably.

In this way, in Example 5, by dividing access to the plurality of memories among a plurality of CPUs, synchronizing the access times of the plurality of CPUs, then simultaneously accessing the memories, it is possible to concentrate the supply of current from a DDC into a short time and increase the current in a short time. By this short time increase in current, it becomes possible to give rapid voltage load fluctuation. Due to this, it is possible to more quickly and reliably detect trouble in a DDC.

Figure 18:
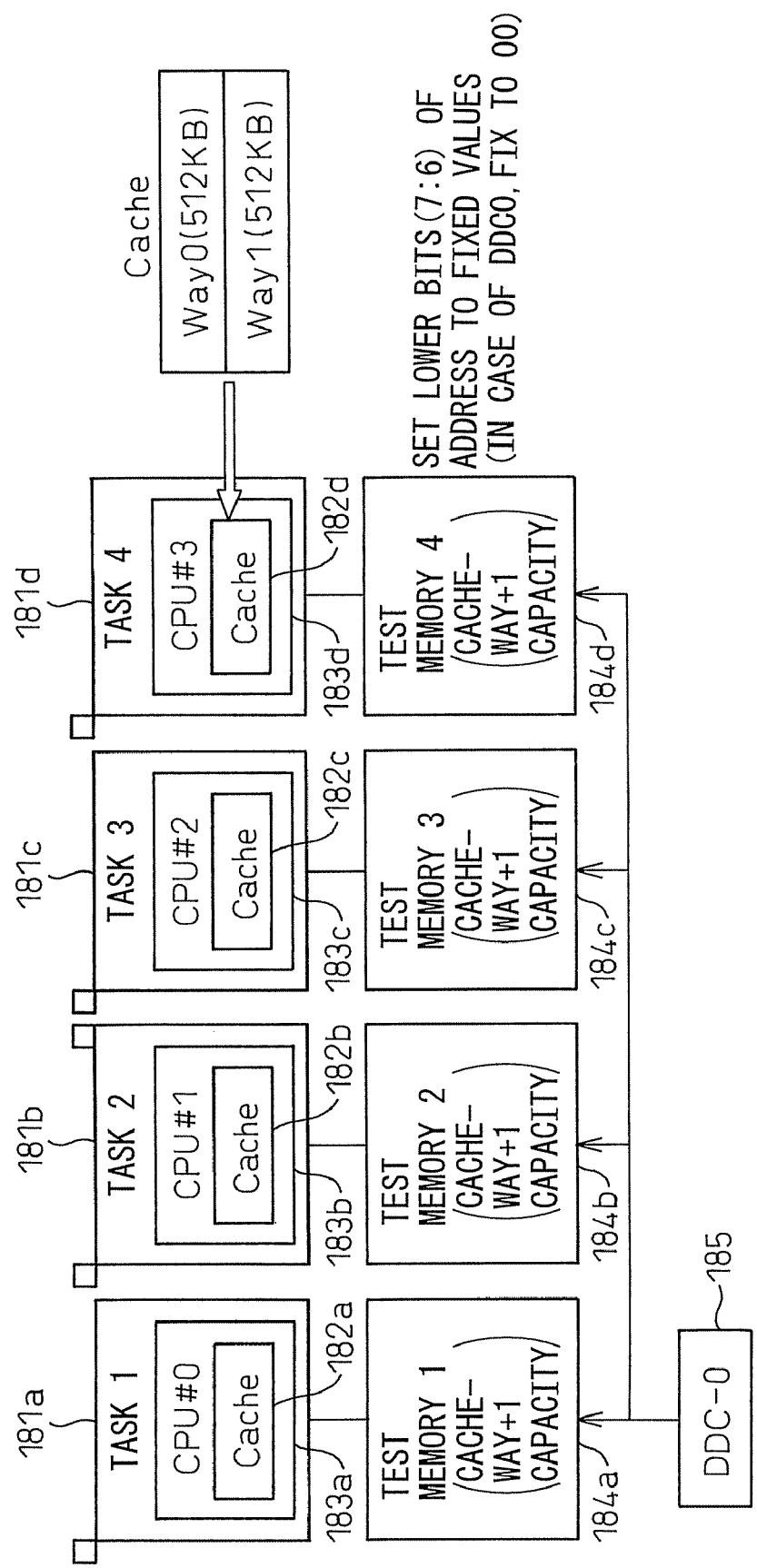
FIG. 18 is a schematic view of the configuration of a computer system showing a specific example of Example 5.

FIG. 18 is a schematic view of the configuration of a computer system showing a specific example of Example 5. In the figure, 181*a* to 181*d* indicate tasks executed by the CPUs 183*a* to 183*d* having built-in cache memories 182*a* to 182*d*, 184*a* to 184*d* indicate test memories, and 185 is a power source (DDC-0). Each CPU is provided with a task. Each cache memory secures a capacity of way number+1.

In Example 5, by having a plurality of CPUs simultaneously access a plurality of memories and increasing the current supplied from a DDC in a short time, it is possible to generate rapid voltage load fluctuations in the output of a DDC and thereby enable trouble in a DDC to be detected faster and more reliably.

In Example 4, a single CPU accesses four test memories to find the voltage load fluctuation, but in Example 5, by having four test memories accessed shared by four CPUs, four times the operations can be performed at one time, so it is possible to increase the current in a short time and generate rapid load fluctuation voltage. Due to this, it is possible to more quickly and reliably detect trouble in a DDC.

Figure 19:
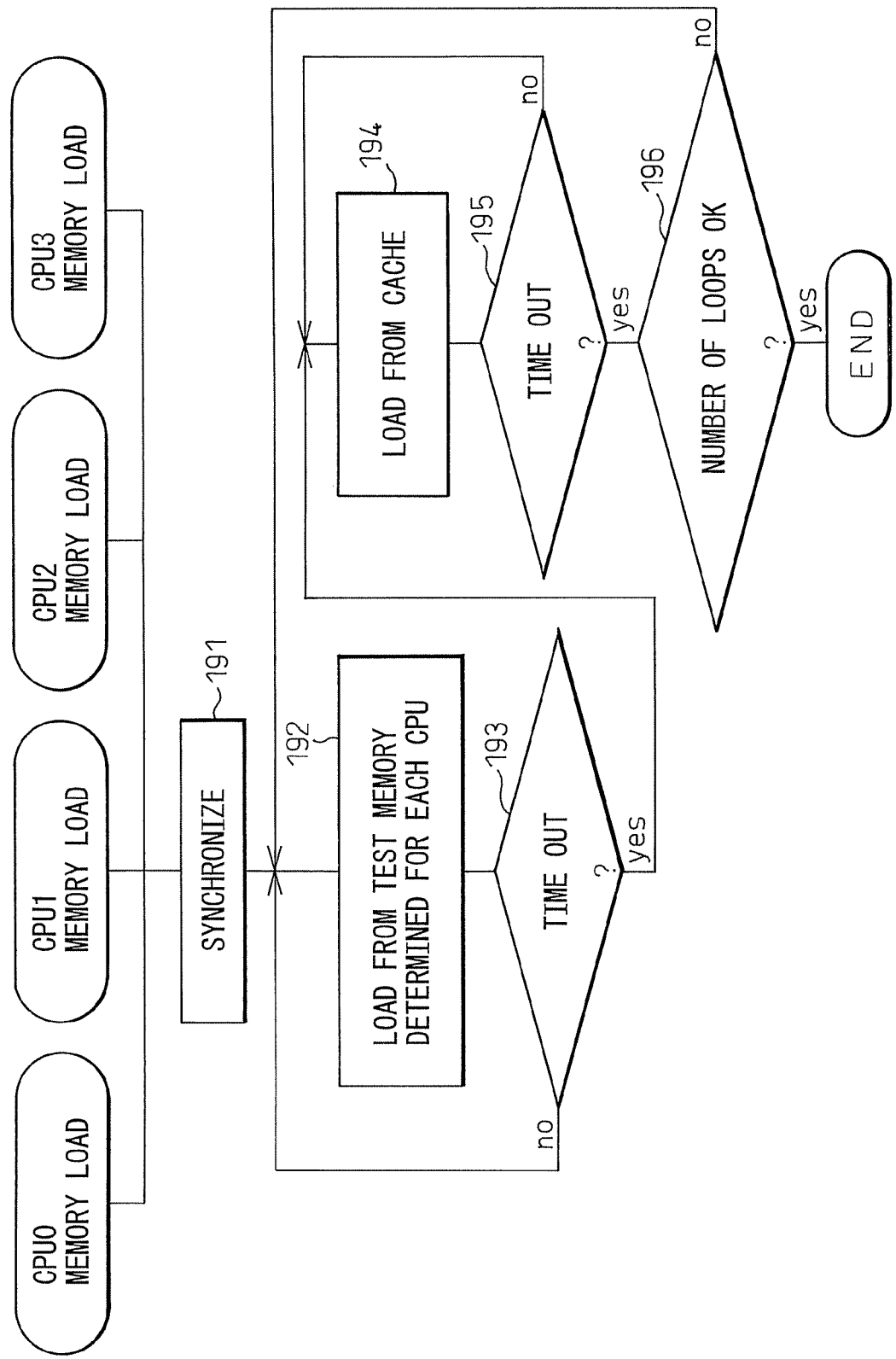
FIG. 19 is a flow chart for explaining a power source fault detection operation in a computer system shown in FIG. 18.

FIG. 19 is a flow chart for explaining a power source fault detection operation in a computer system shown in FIG. 18. In the figure, at step 191, the memory load operations of the CPU0 to CPU3 are synchronized. At step 192, the CPU0 to CPU3 simultaneously access the test memory 1 (184*a*) to test memory 4 (184*d*) and load the memory contents. At step 193, step 192 is repeated until a predetermined time elapses. When a predetermined time elapses at step 193, at step 194, the data is loaded from the cache memory. At step 195, step 194 is repeated until another predetermined time elapses. When the predetermined time elapses at step 195, the operation from step 192 to step 195 is performed exactly the predetermined number of loops. At step 196, when over the predetermined number of loops, the processing is ended.

EXAMPLE 6

Figure 20:
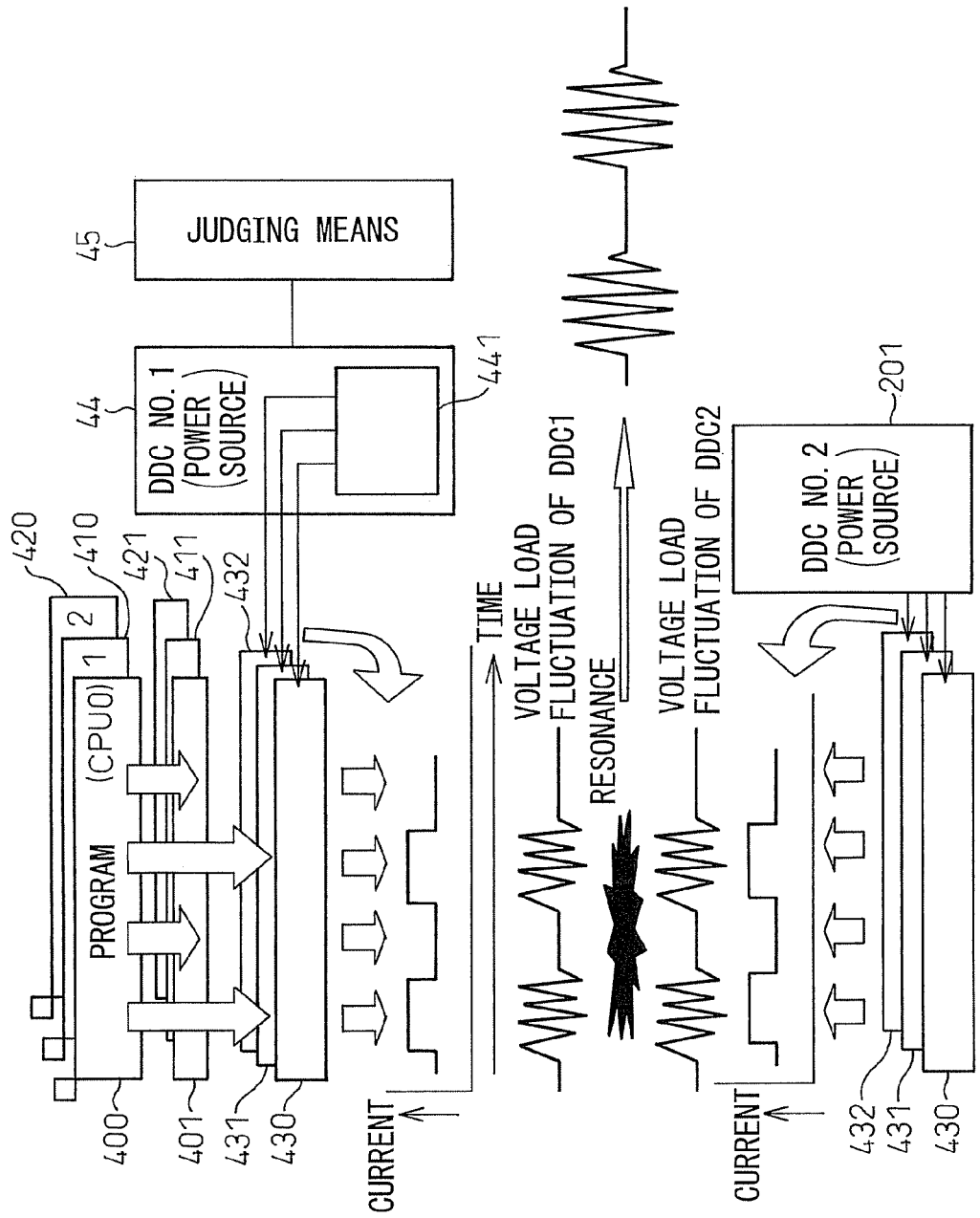
FIG. 20 is a block diagram showing the schematic configuration of a computer system according to Example 6 of the present invention.

FIG. 20 is a block diagram showing the schematic configuration of a computer system according to Example 6 of the present invention. In the figure, the point of difference from the fault detection apparatus of Example 1 shown in FIG. 4 is that, in Example 1, there is a single DDC, while in Example 6, there are a plurality of adjoining DDCs 44 and 201. By synchronizing the periods of the currents supplied from the plurality of adjoining DDCs in this way, as illustrated, rapid voltage load fluctuations are caused in the outputs of the DDCs. Due to this, it is possible to more quickly and reliably detect trouble in a DDC.

In Example 6, as described in Example 3, by specifying the addresses of a plurality of DDCs and using the plurality of adjoining DDCs to simultaneously perform the operations described in Examples 1 to 5, the DDCs resonant with each other, the output voltages of the DDCs change in the same direction, and further voltage load fluctuations are caused. Due to this, it is possible to more quickly and reliably detect trouble in a DDC.

That is, by dividing memory access among a plurality of CPUs, synchronizing the access times of the plurality of CPUs, and simultaneously accessing the memories, it is possible to concentrate the supply of current from the DDCs in a short time and to increase the current in a short time. This short time increase in current enables rapid load fluctuation of the voltage to be given. Due to this, it is possible to more quickly and reliably detect trouble in a DDC.

Figure 21:
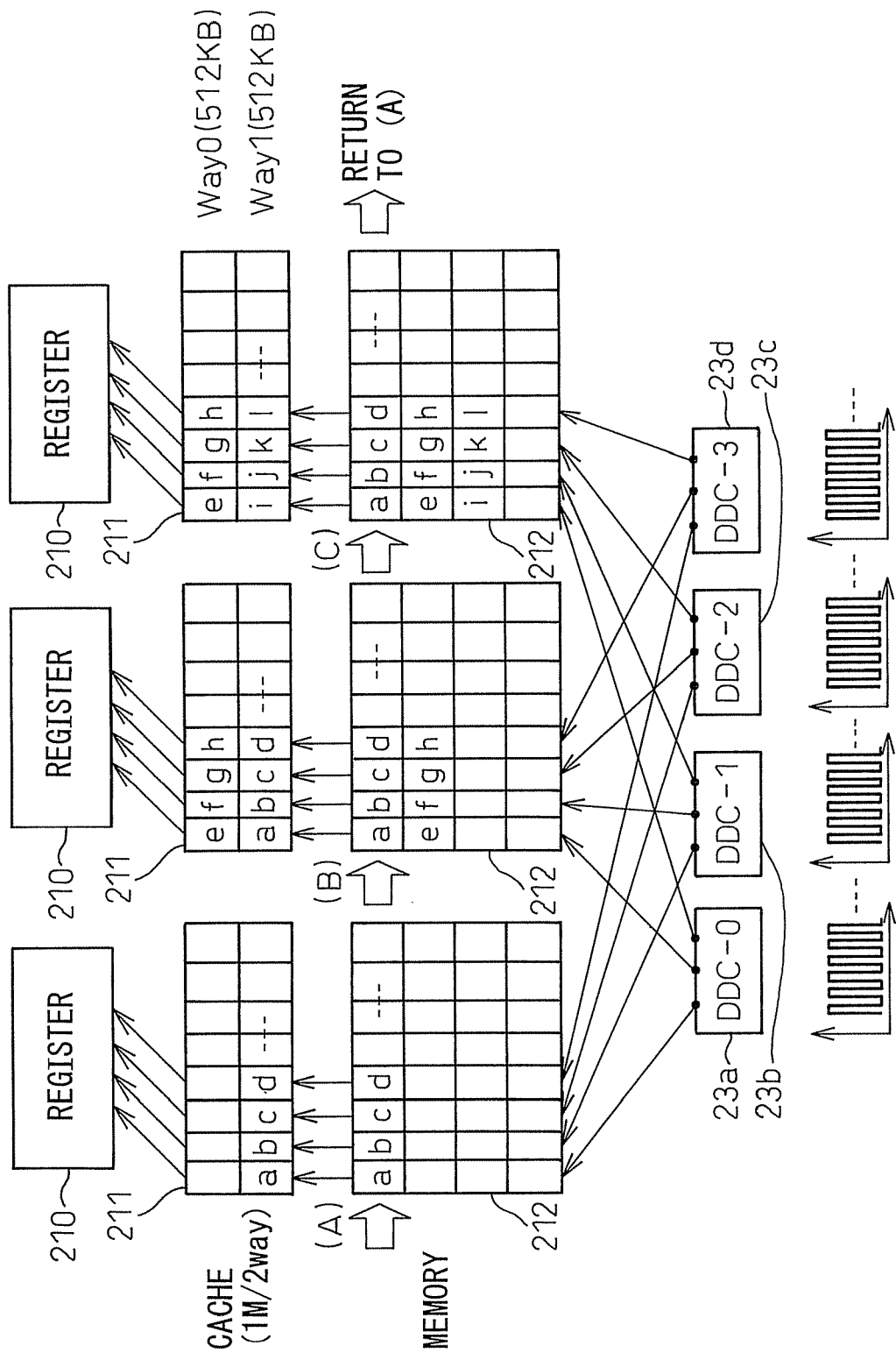
FIG. 21 is a schematic view of the configuration of a computer system showing a specific example of Example 6.

FIG. 21 is a schematic view of the configuration of a computer system showing a specific example of Example 6. In the figure, 210 indicates a register, 211*a* cache memory, 212 a memory, and 23*a*, 23*b*, 23*c*, and 23*d* a plurality of power sources (DDC). The register 210 and cache memory 211 are included in a not shown CPU.

Figure 22:
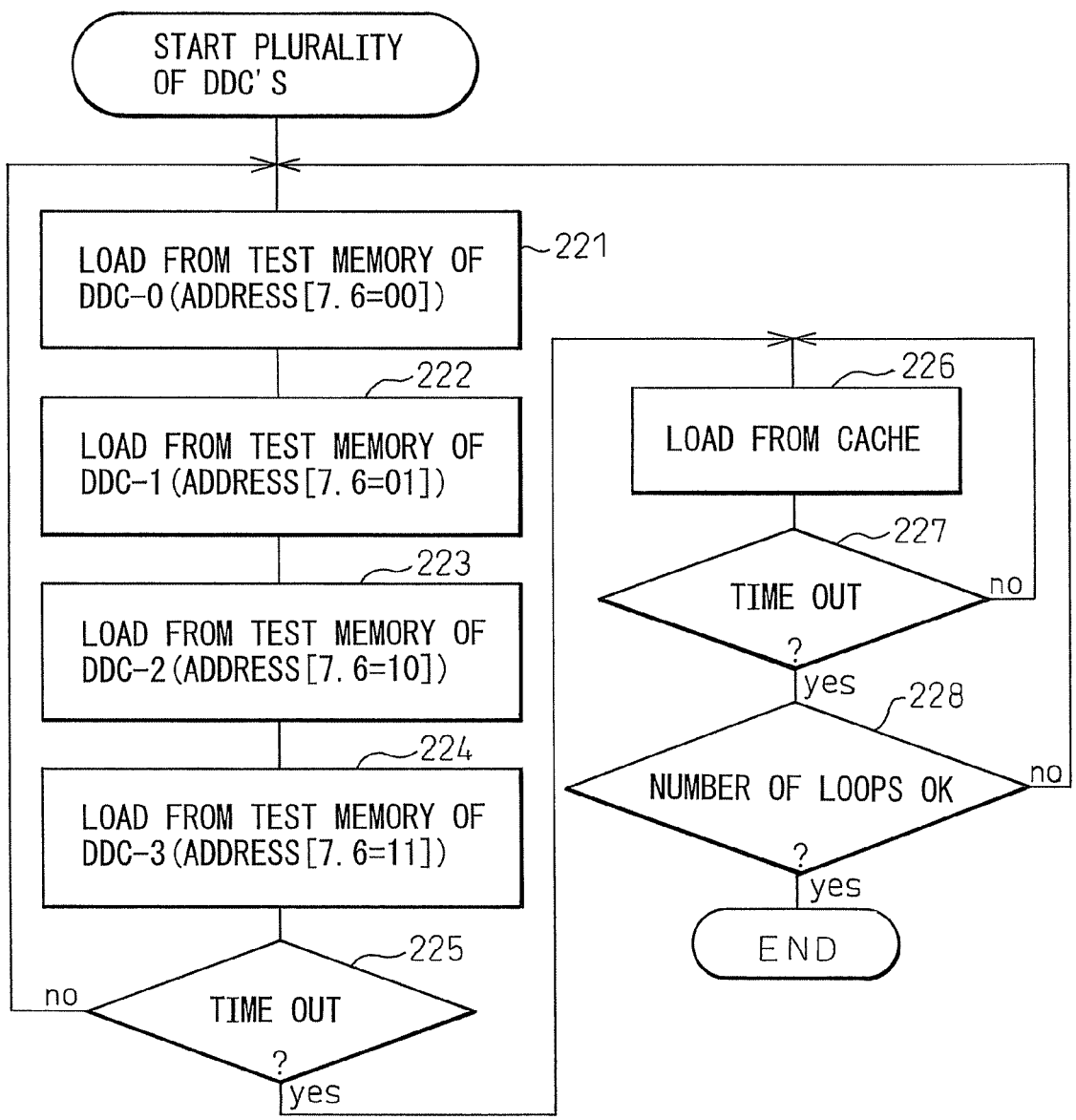
FIG. 22 is a flow chart for explaining a power source fault detection operation in the computer system shown in FIG. 21.

FIG. 22 is a flow chart for explaining the power source fault detection operation in the computer system shown in FIG. 21. In the figure, from steps 221 to 224, substantially simultaneously, current is supplied from the DDC0 (23*a*) to DDC3 (23*d*) to the corresponding memory areas so that the CPU loads the data from the memory areas. For example, at step 221, the DDC0 (23*a*) supplies current to the area a of the memory 212, at step 222, the DDC1 (23*b*) supplies current to the area b corresponding to the memory 212, at step 223, the DDC2 (23*c*) supplies current to the area c corresponding to the memory 212, and at step 224, the DDC3 (23*d*) supplies current to the area d corresponding to the memory 212. Next, at step 225, it is judged of a predetermined time has elapsed. If within the predetermined time, steps 221 to 224 are repeated. By this repeated operation, the memory 212 changes in state like (A), (B), (C) . . . At the state (A), the contents a, b, c, and d of the memory 212 are copied to the lower way of the cache memory 211. At the state (B), the second level contents e, f, g, and h of the memory 212 are copied to the upper way of the cache memory 211. At the state (C), the data a, b, c, and d of the lower way of the cache memory 211 are discharged and instead the third level contents i, j, k, and l of the memory 212 are copied to the lower way of the cache memory 211. In this way, by supplying currents from a plurality of DDC substantially simultaneously to adjoining areas of a memory, the electromagnetic phenomenon affects the output voltages of the adjoining DDCs. Due to this, the output voltages of the DDCs rise. When exceeding a predetermined threshold value, the DDC in question is judged to be defective.

At step 226, the CPU accesses the cache memory and loads the data. At step 227, it judges if another predetermined time has elapsed. If within the predetermined time, step 226 is repeated. If the predetermined time is exceeded, at step 228 it is judged if the predetermined number of loops has been reached. If not, steps 221 to 227 are repeated. If the predetermined number of loops is exceeded at step 228, the processing is ended.

EXAMPLE 7

Figure 23A:
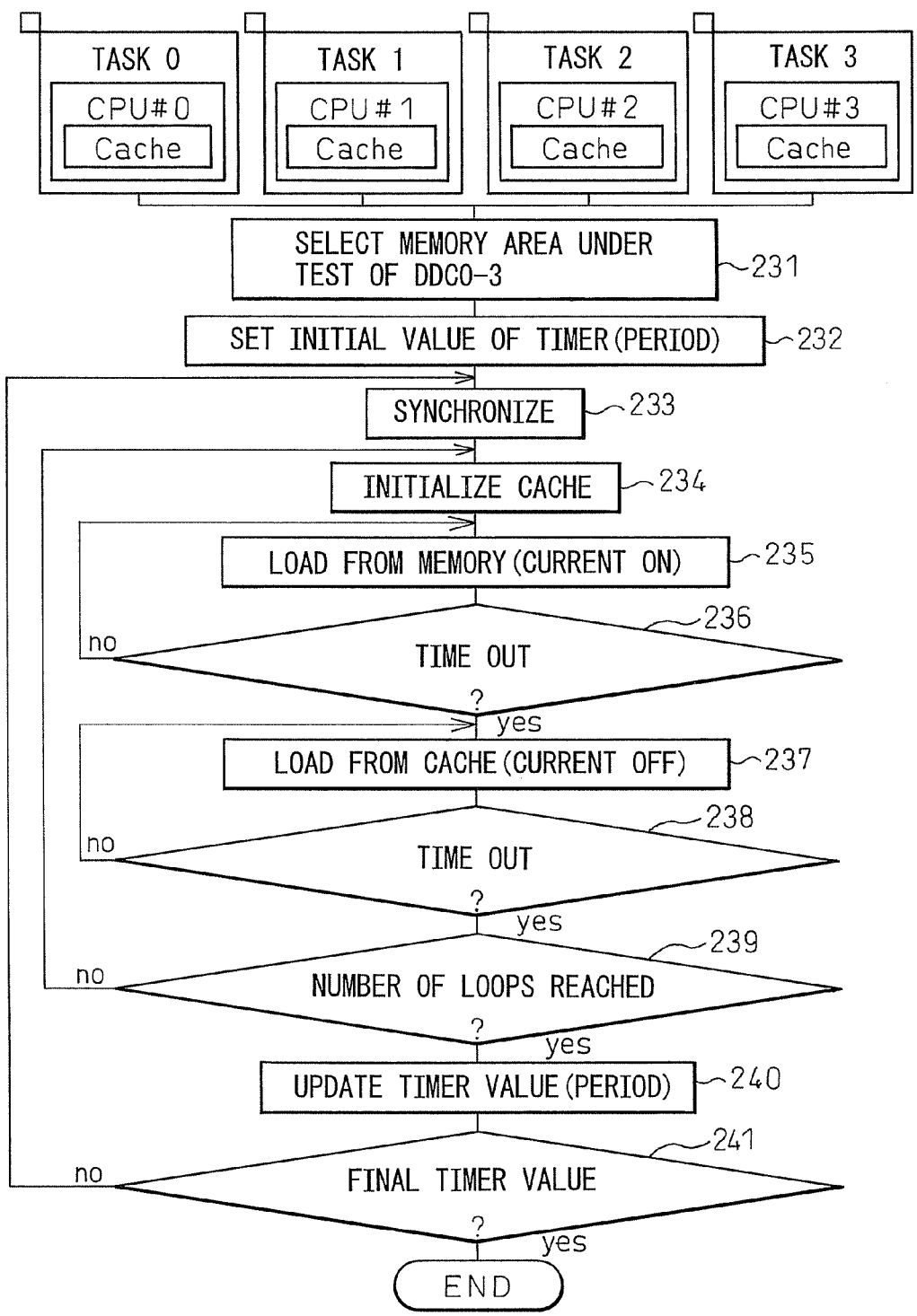
FIG. 23A is a flow chart showing a program covering Examples 1 to 6 according to Example 7 of the present invention.

FIG. 23A is a flow chart showing a program covering Examples 1 to 6 according to Example 7 of the present invention. In the figure, at step 231, all of the CPUs mounted in the test system are designated for testing, each CPU is provided with a task, and that task selects the DDC to be tested and acquires the memory (range) receiving power from the DDC. In this case, there are the following two cases:

Example 1: Case of dividing DDCs under test for each task

Example 2: Case of having all tasks support DDC0 to DDC3

Figure 23B:
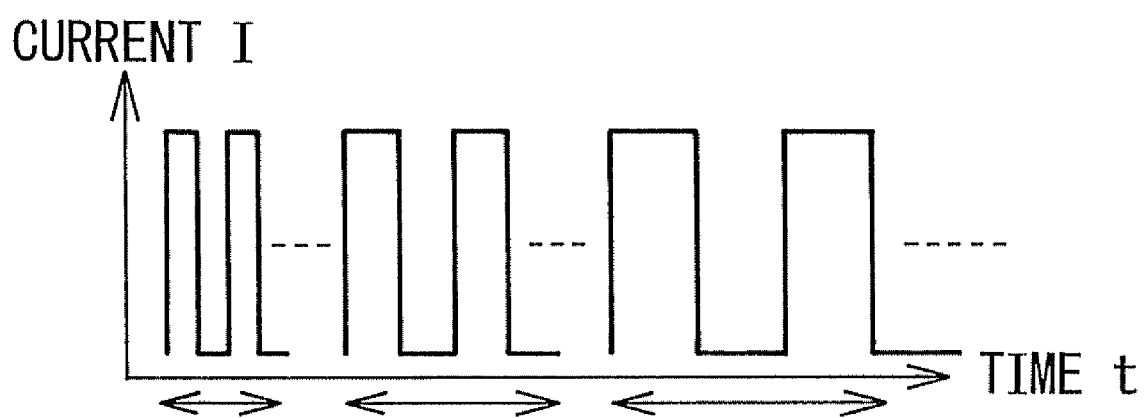
FIG. 23B is a waveform chart showing supply current in Example 7.

Next, at step 232, the initial value of the timer is set so that the period of the current frequency becomes the shortest. Next, at step 233, all tasks (CPUs) are synchronized. The tasks, at step 234, initialize the cache, then, at step 235 and 236, repeat the memory access (current on) for the memory under test as shown in FIG. 23B until the time runs out. In this case, to constantly access the memory, they execute an expulsion routine from the cache memory. The same period is repeated for the number of loops until the time runs out. After the time runs out, the tasks repeat the cache access (current off) for the memory under test at steps 237 and 238 until the time runs out. In this case, the addresses used are the addresses in the cache. The addresses are not updated. At step 239, steps 234 to 239 are repeated until a constant number of loops. The number of periods of the same period duration is created here. Next, at step 240, the timer value is updated. Due to this, the period duration of the on period of the current is increased as shown in FIG. 23B. Next, at step 241, steps 234 to 240 are repeated until the final period duration. Due to this, the period duration is gradually increased and the DDCs can be tested for the entire area of the memory.

Figure 24:
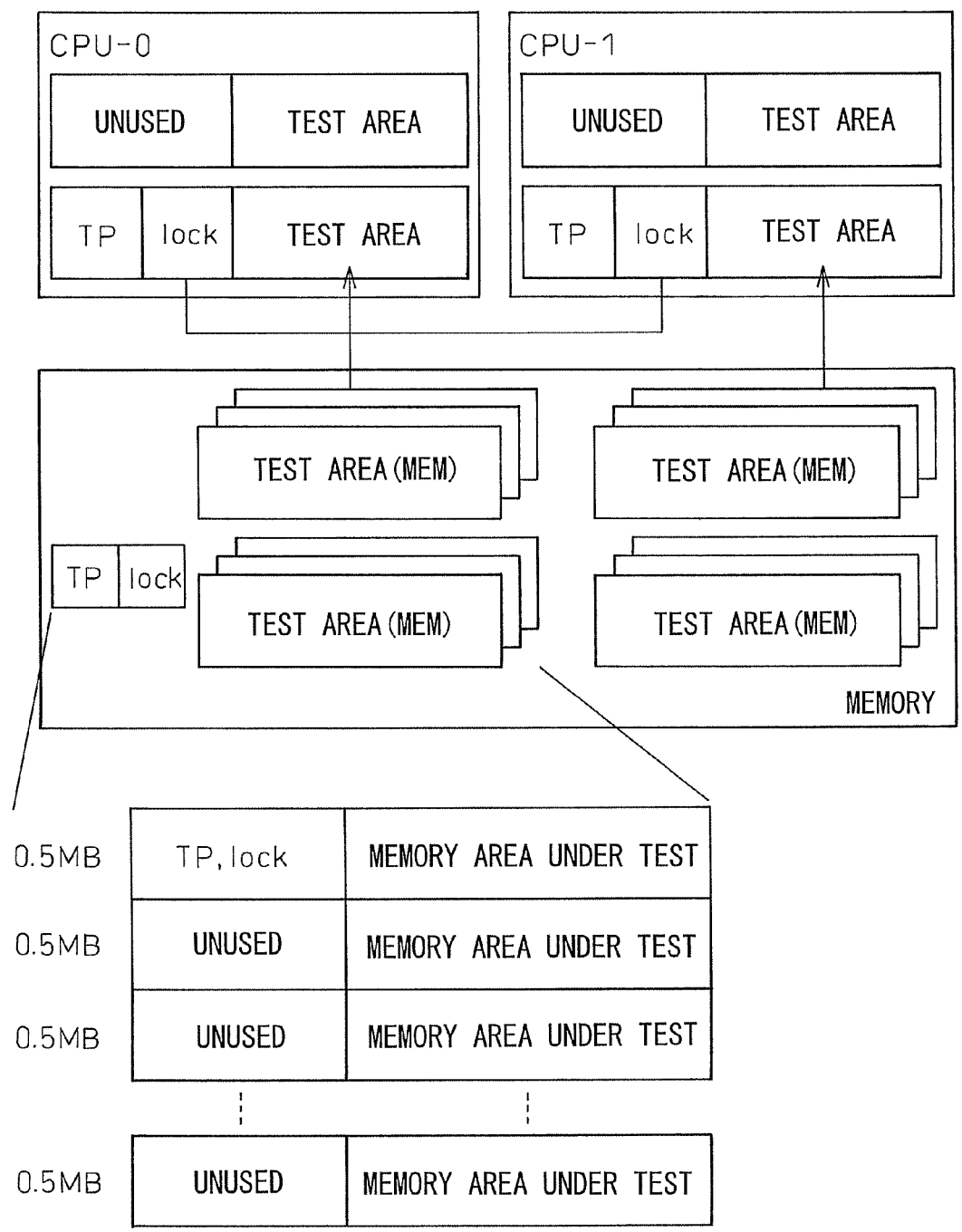
FIG. 24 is a view for explaining the workability of the present invention.

FIG. 24 is a view explaining the workability of the present invention. As explained in the above examples, in the present invention, the cache memory on a CPU and a memory outside the CPU are used to give load fluctuations to the voltages of the DDCs supplying power to the memories. Here, the problem becomes that the program is also run in the cache memory in the CPU. If the CPU cache memory used by the program is covered by the test, data will be expelled from the cache memory and the logic will end up collapsing, so correct operation can no longer be guaranteed. To solve this problem, the cache line used by the program is excluded from the coverage of the test. Due to this, once the program is read from a memory to the CPU cache, it runs only on the CPU cache, so will no longer affect the test. Similarly, the CPU cache line used by a test required for synchronization among the plurality of CPUs is also excluded from the test coverage. Due to this, synchronization by the plurality of CPUs is also performed between the caches and the memory accesses can be used just for tests. However, among the instructions used synchronously, atomic instructions (instructions for writing in the memories) are forbidden from use.

Figure 25:
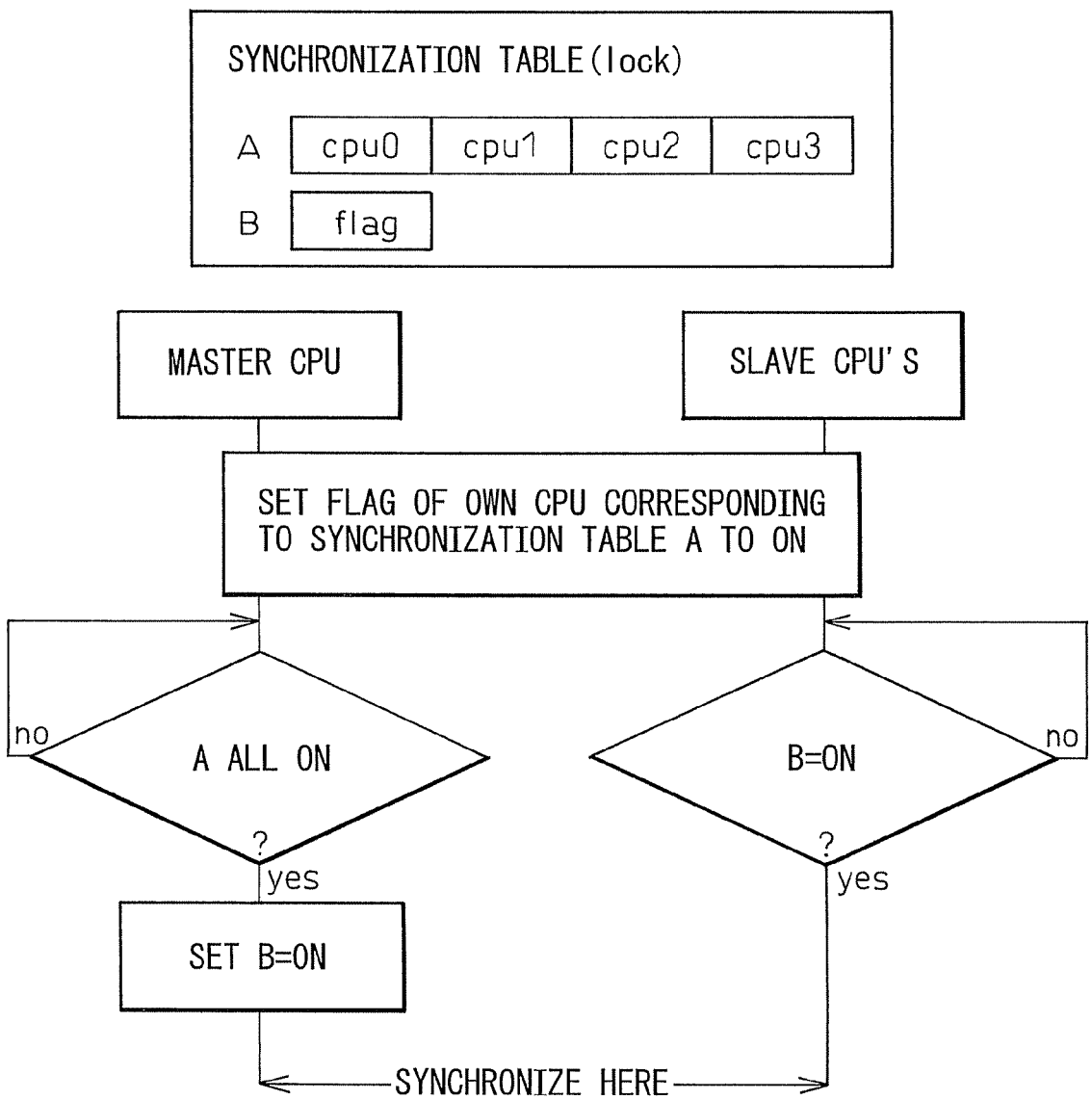
FIG. 25 is a flow chart for explaining synchronization of CPUs according to the present invention.

FIG. 25 is a flow chart explaining the synchronization of CPUs according to the present invention. This synchronization is performed on the caches without using the memories, so synchronization is performed without using atomic instructions, that is, by just using general instructions (load: ldub, store: stb).

Below, the processing will be explained. As a synchronization table, the number of CPUs worth of 1-byte flags (A) and a flag (B) for notification of completion of synchronization are prepared.

Next, the CPUs are divided into a master (1 unit) and slaves (all remaining units). When synchronizing them, first, at both the master and slave units, the flags (A) of their own CPU areas are set on. For example, if the CPU1, 1 (one) is set in the byte of the CPU1 of (A). The slaves wait until the flag (B) becomes on, judge synchronization has been established when it becomes on, then proceeds to the next processing.

The master monitors the flags (A) until all have become on, sets the flag (B) on when they have become on, then proceeds to the next processing.

In the above explanation of the examples, the power source DDCs supplying current to memories in a computer system were covered by the fault detection, but the present invention is not limited to this. All devices enabling control of current fluctuation of power receivers may be covered by the fault detection of the present invention.

According to the present invention, defective power sources can be detected early and the quality of the power sources can be ensured even in a high density mounting computer system.

While the invention has been described with reference to specific embodiments chosen for purpose of illustration, it should be apparent that numerous modifications could be made thereto by those skilled in the art without departing from the basic concept and scope of the invention.

The invention claimed is:

1. A fault detection method of a power source that includes a plurality of power source units and a power receiver having a plurality of power receiving units specified by a plurality of addresses, the method comprising:

supplying a periodic current periodically repeatedly turning on and off from the power source to the power receiver;

judging the power source to be defective when the output voltage of the power source exceeds a specified threshold value;

specifying an address of the power receiver; and supplying the power receiving unit corresponding to the specified address with a current of an on period of the periodic current to detect trouble of any power source unit corresponding to each power receiving unit.

2. The fault detection method of a power source as set forth in claim 1, further comprising:

changing the period of the periodic current to cover the entire state of output impedance of the power source.

3. A fault detection method of a power source that includes a single power source unit and a power receiver having a plurality of power receiving units specified by a plurality of addresses, the method comprising:

supplying a periodic current periodically repeatedly turning on and off from the power source to the power receiver;

judging the power source to be defective when the output voltage of the power source exceeds a specified threshold value;

successively specifying addresses of the power receivers; and supplying the power receivers corresponding to the specified addresses with a current of an on period of the periodic current to detect trouble of the power source.

4. The fault detection method of a power source as set forth in claim 3, further comprising:

changing the period of the periodic current to cover the entire state of output impedance of the power source.

5. A fault detection method of a power source that includes a single power source unit and a power receiver having a plurality of power receiving units specified by a plurality of addresses, the method comprising:

supplying a periodic current periodically repeatedly turning on and off from the power source to the power receiver;

judging the power source to be defective when the output voltage of the power source exceeds a specified threshold value;

simultaneously specifying addresses of the power receivers; and supplying the power receiving units corresponding to the specified addresses with a current of an on period of the periodic current to detect trouble of the power source.

6. The fault detection method of a power source as set forth in claim 5, further comprising:

changing the period of the periodic current to cover the entire state of output impedance of the power source.

7. A fault detection method of a power source that includes a plurality of adjoining power sources and a power receiver having a plurality of memories, the method comprising:

supplying a periodic current periodically repeatedly turning on and off from the power source to the power receiver;

judging the power source to be defective when the output voltage of the power source exceeds a specified threshold value;

having the power receiver synchronize currents of the on periods of the periodic currents output from the plurality of power sources; and simultaneously supplying the synchronized currents to the plurality of memories to detect trouble of the power sources.

8. The fault detection method of a power source as set forth in claim 7, further comprising:

changing the period of the periodic current to cover the entire state of output impedance of the power source.

9. A fault detection method of a power source, wherein a power receiver is a memory in a computer system, the method comprising:

supplying a periodic current periodically repeatedly turning on and off from the power source to the power receiver;

judging the power source to be defective when the output voltage of the power source exceeds a specified threshold value;

periodically accessing the memory from a central processing unit provided with a cache memory;

supplying a current of an on period of the periodic current from the power source to the memory;

accessing the cache memory; and reading and writing information in an off period of the periodic current.

10. The fault detection method of a power source as set forth in claim 9, further comprising:

changing the period of the periodic current to cover the entire state of output impedance of the power source.

* * * * *